(12) United States Patent
Kim et al.

(10) Patent No.: US 12,537,000 B2
(45) Date of Patent: Jan. 27, 2026

(54) METHOD OF IDENTIFYING TARGET DEVICE AND ELECTRONIC DEVICE THEREFOR

(71) Applicant: SAMSUNG ELECTRONICS CO., LTD., Suwon-si (KR)

(72) Inventors: Jinwook Kim, Suwon-si (KR); Jaeyung Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 454 days.

(21) Appl. No.: 18/067,277

(22) Filed: Dec. 16, 2022

(65) Prior Publication Data

US 2023/0197075 A1 Jun. 22, 2023

Related U.S. Application Data

(63) Continuation of application No. PCT/KR2022/019996, filed on Dec. 9, 2022.

(30) Foreign Application Priority Data

Dec. 21, 2021 (KR) .................. 10-2021-0184164

(51) Int. Cl.
*G10L 15/22* (2006.01)
*G06F 3/16* (2006.01)
*G06F 16/9032* (2019.01)

(52) U.S. Cl.
CPC .............. *G10L 15/22* (2013.01); *G06F 3/167* (2013.01); *G06F 16/90332* (2019.01); *G10L 2015/223* (2013.01)

(58) Field of Classification Search
None
See application file for complete search history.

(56) References Cited

U.S. PATENT DOCUMENTS 7,496,500 B2   2/2009   Reed et al.
7,941,492 B2   5/2011   Pearson et al.
(Continued)

FOREIGN PATENT DOCUMENTS

JP   2002-182679   6/2002
JP   2007-101892   4/2007
(Continued)

OTHER PUBLICATIONS

Search Report dated Mar. 30, 2023 in counterpart International Patent Application No. PCT/KR2022/019996 and English-language translation.

*Primary Examiner* — Jonathan C Kim
(74) *Attorney, Agent, or Firm* — Nixon & Vanderhye, P.C.

(57) ABSTRACT

An example electronic device includes communication circuitry, a processor, and a memory that stores instructions. The electronic device may be configured to obtain utterance data and location information of a user, identify a type and control function of a target device based on the utterance data, identify a plurality of candidate electronic devices corresponding to the location information and the type, identify a common function between the plurality of candidate electronic devices based on identification of the plurality of candidate electronic devices, provide a notification by differently controlling the common function for each of the plurality of candidate electronic devices, obtain, from the user, response utterance data including a response to the notification, determine the target device that is to perform the control function among the plurality of candidate electronic devices based on the response utterance data, and control the target device to perform the control function.

10 Claims, 22 Drawing Sheets

(56) References Cited

U.S. PATENT DOCUMENTS

| | | | |
|---|---|---|---|
| 8,075,316 | B2 | 12/2011 | Krause et al. |
| 8,161,125 | B2 | 4/2012 | Pearson et al. |
| 8,230,032 | B2 | 7/2012 | Pearson et al. |
| 9,226,304 | B2 | 12/2015 | Chen et al. |
| 10,283,116 | B2 | 5/2019 | Ko et al. |
| 10,408,928 | B2 | 9/2019 | Park et al. |
| 10,521,723 | B2 | 12/2019 | Hwang et al. |
| 10,783,883 | B2 | 9/2020 | Mixter et al. |
| 10,847,024 | B2 | 11/2020 | Shin et al. |
| 10,884,096 | B2 | 1/2021 | Baek et al. |
| 10,885,917 | B2 | 1/2021 | Schairer et al. |
| 10,964,327 | B2 | 3/2021 | Lee et al. |
| 10,991,462 | B2 | 4/2021 | Ko et al. |
| 11,417,338 | B2 | 8/2022 | Hahm et al. |
| 2002/0091519 | A1* | 7/2002 | Lewis ................. G10L 15/063 704/235 |
| 2005/0192992 | A1 | 9/2005 | Reed et al. |
| 2015/0006184 | A1* | 1/2015 | Marti .................. G10L 15/22 704/275 |
| 2017/0206896 | A1 | 7/2017 | Ko et al. |
| 2018/0165581 | A1 | 6/2018 | Dwang et al. |
| 2019/0295542 | A1* | 9/2019 | Huang .................. G06F 3/167 |
| 2019/0327124 | A1 | 10/2019 | Lai et al. |
| 2019/0362715 | A1* | 11/2019 | Aggarwal ............ G06F 3/1423 |
| 2020/0092687 | A1* | 3/2020 | Devaraj ............... H04R 3/005 |
| 2020/0177408 | A1 | 6/2020 | Ko et al. |
| 2020/0349940 | A1* | 11/2020 | Ko ......................... G10L 15/22 |
| 2020/0349952 | A1 | 11/2020 | Lee et al. |
| 2021/0005202 | A1 | 1/2021 | Mixter et al. |
| 2021/0049899 | A1 | 2/2021 | Shin et al. |
| 2021/0072953 | A1* | 3/2021 | Amarilio ............... G10L 15/22 |
| 2021/0090566 | A1 | 3/2021 | Schairer et al. |
| 2021/0183393 | A1 | 6/2021 | Lee et al. |
| 2021/0215789 | A1 | 7/2021 | Hu et al. |
| 2021/0232235 | A1 | 7/2021 | Regani et al. |
| 2022/0049971 | A1* | 2/2022 | Lee ..................... G06V 40/172 |
| 2023/0197075 | A1* | 6/2023 | Kim .................... H04L 12/282 704/275 |
| 2024/0146776 | A1* | 5/2024 | Hansen ................. H04L 67/52 |

FOREIGN PATENT DOCUMENTS

| | | |
|---|---|---|
| JP | 2012-169783 | 9/2012 |
| KR | 10-2017-0044419 | 4/2017 |
| KR | 10-2018-0068850 | 6/2018 |
| KR | 10-1972545 | 4/2019 |
| KR | 10-2042194 | 11/2019 |
| KR | 10-2019-0141109 | 12/2019 |
| KR | 10-2020-0015083 | 2/2020 |
| KR | 10-2020-0127814 | 11/2020 |
| WO | 2018/085671 | 5/2018 |
| WO | 2019/178229 | 9/2019 |

\* cited by examiner

METHOD OF IDENTIFYING TARGET DEVICE AND ELECTRONIC DEVICE THEREFOR

CROSS-REFERENCE TO RELATED APPLICATIONS

This application is a continuation application of International Application No. PCT/KR2022/019996 designating the United States, filed on Dec. 9, 2022, at the Korean Intellectual Property Receiving Office and claiming priority to Korean Patent Application No. 10-2021-0184164, filed on Dec. 21, 2021, at the Korean Intellectual Property Office, the disclosures of which are incorporated by reference herein in their entireties.

BACKGROUND

Field

The disclosure relates to a method of identifying a target device and an electronic device therefor.

Description of Related Art

Technologies for controlling an electronic device based on a user's voice command are widely used. For example, an electronic device may include a voice assistant configured to identify a user's intent from a user's speech and perform an operation corresponding to the identified intent. The user may easily control the electronic device through the voice command.

As use of Internet-of-things (IoT) devices increases, a technology that enables a user to control another electronic device such as an IoT device is widely used. A listener device such as a cell phone or an artificial intelligence (AI) speaker may obtain a user speech and control another IoT device through a network (such as the Internet) based on the speech. For example, when a user's speech is "turn off the living room lamp", the voice assistant may turn off a lamp positioned in a living room of a home of the user.

SUMMARY

When controlling an external electronic device based on a speech, the voice assistant may be required to identify a target device to be controlled from the speech. When it is impossible to identify the target device, it may be difficult to perform an operation satisfying the intent of a user's speech. In order to identify a target device, the voice assistant may attempt to identify the target device using a variety of information included in the speech. For example, the voice assistant may identify the target device using the name of the target device included in the speech. The name of the target device may be set by the user or location information specified by the user. When the user utters "turn off the living room TV", the voice assistant may turn off a TV, the location of which is designated as a living room. As described above, a method of identifying a target device using the name of a device included in a speech may be referred to as a named dispatch.

In the case of a named dispatch, a user's speech may be complicated since the user is required to always mention a target device. When the user speaks without mentioning a target device, it may be difficult to identify the target device. For example, when the user utters "turn on music", a plurality of external devices capable of turning on music may be present. Since the user is required to always add the name of a target device to a speech, a user's speech tends to increase in length, and user's convenience tends to be degraded.

Furthermore, an increase in the number of devices to be controlled may make it more difficult to identify a target device. The user may experience difficulty in naming each device. If an arbitrary name is allocated to each device, it may be hard for the user to know the name of a corresponding device. For example, it may be assumed that four lamps located in a living room are named a first lamp, a second lamp, a third lamp, and a fourth lamp. When the speech "turn on the lamp" is received from the user, an electronic device may ask the user about which lamp should be turned on through a display. However, it may be hard for the user to recognize which lamp is indicated by the first lamp, the second lamp, the third lamp, or the fourth lamp.

Various embodiments of the present disclosure may provide an electronic device and a method for resolving the above-described problems.

An electronic device according to various example embodiments of the disclosure may include communication circuitry, a processor, and memory that stores instructions, wherein the instructions, when executed by the processor, cause the electronic device to obtain utterance data and location information of a user, identify a type and control function of a target device based on the utterance data, identify a plurality of candidate electronic devices corresponding to the location information and the type, identify a common function between the plurality of candidate electronic devices based on identification of the plurality of candidate electronic devices, provide a notification by differently controlling the common function for each of the plurality of candidate electronic devices, obtain, from the user, response utterance data including a response to the notification, determine the target device that is to perform the control function among the plurality of candidate electronic devices based on the response utterance data, and control the target device so that the target device performs the control function using the communication circuitry.

A method for an electronic device to control a target device according to various example embodiments of the disclosure may include obtaining utterance data and location information of a user, identifying a type and control function of a target device based on the utterance data, identifying a plurality of candidate electronic devices corresponding to the location information and the type, identifying a common function between the plurality of candidate electronic devices based on identification of the plurality of candidate electronic devices, providing a notification by differently controlling the common function for each of the plurality of candidate electronic devices, obtaining, from the user, response utterance data including a response to the notification, determining the target device that is to perform the control function among the plurality of candidate electronic devices based on the response utterance data, and controlling the target device so that the target device performs the control function.

An electronic device according to various example embodiments of the disclosure may include communication circuitry, an audio circuit, a processor, and memory that stores instructions, wherein the instructions, when executed by the processor, cause the electronic device to obtain utterance data of a user using the audio circuit, identify a type and control function of a target device based on the utterance data, identify a plurality of candidate electronic devices corresponding to the type and the control function, identify a common function between the plurality of candidate electronic devices based on identification of the plurality of candidate electronic devices, provide a notification by differently controlling the common function for each of the plurality of candidate electronic devices, obtain, from the user, response utterance data including a response to the notification using the audio circuit, determine the target device that is to perform the control function among the plurality of candidate electronic devices based on the response utterance data, and control the target device so that the target device performs the control function using the communication circuitry.

An electronic device according to various example embodiments of the disclosure may improve user convenience and efficiency of an electronic device by controlling an external device according to the intent of a user utterance.

An electronic device according to various example embodiments of the disclosure may provide an intuitive hint for a target device by providing feedback to a user based on relative locations of external devices.

An electronic device according to various example embodiments of the disclosure may provide an intuitive hint for a target device by providing information for identifying an external device to a user by controlling external devices.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various embodiments of the disclosure will be described in detail with reference to the accompanying drawings. However, it should be understood that the disclosure is not limited to specific embodiments, but rather includes various modifications, equivalents and/or alternatives of the various example embodiments.

Figure 1:
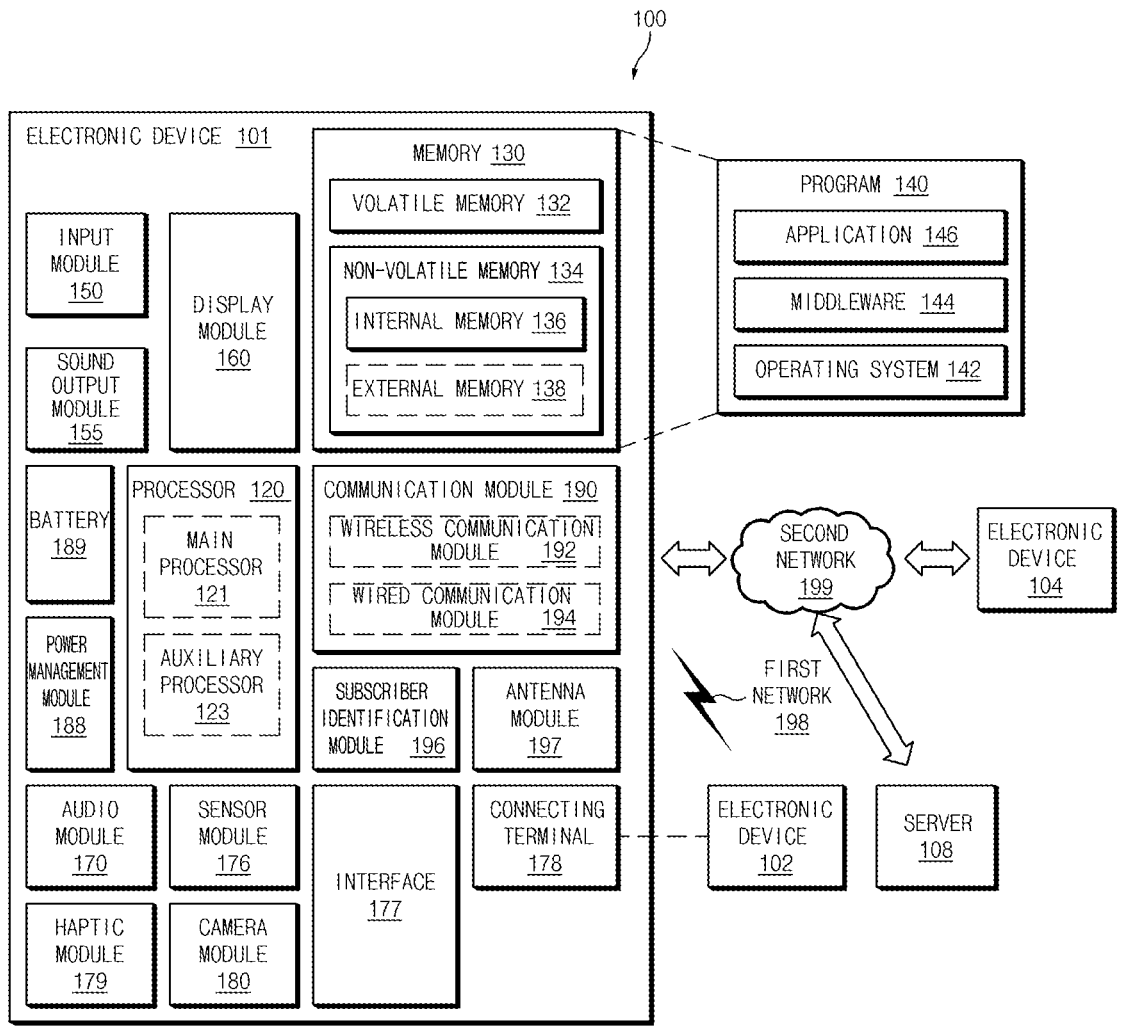
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium may refer, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
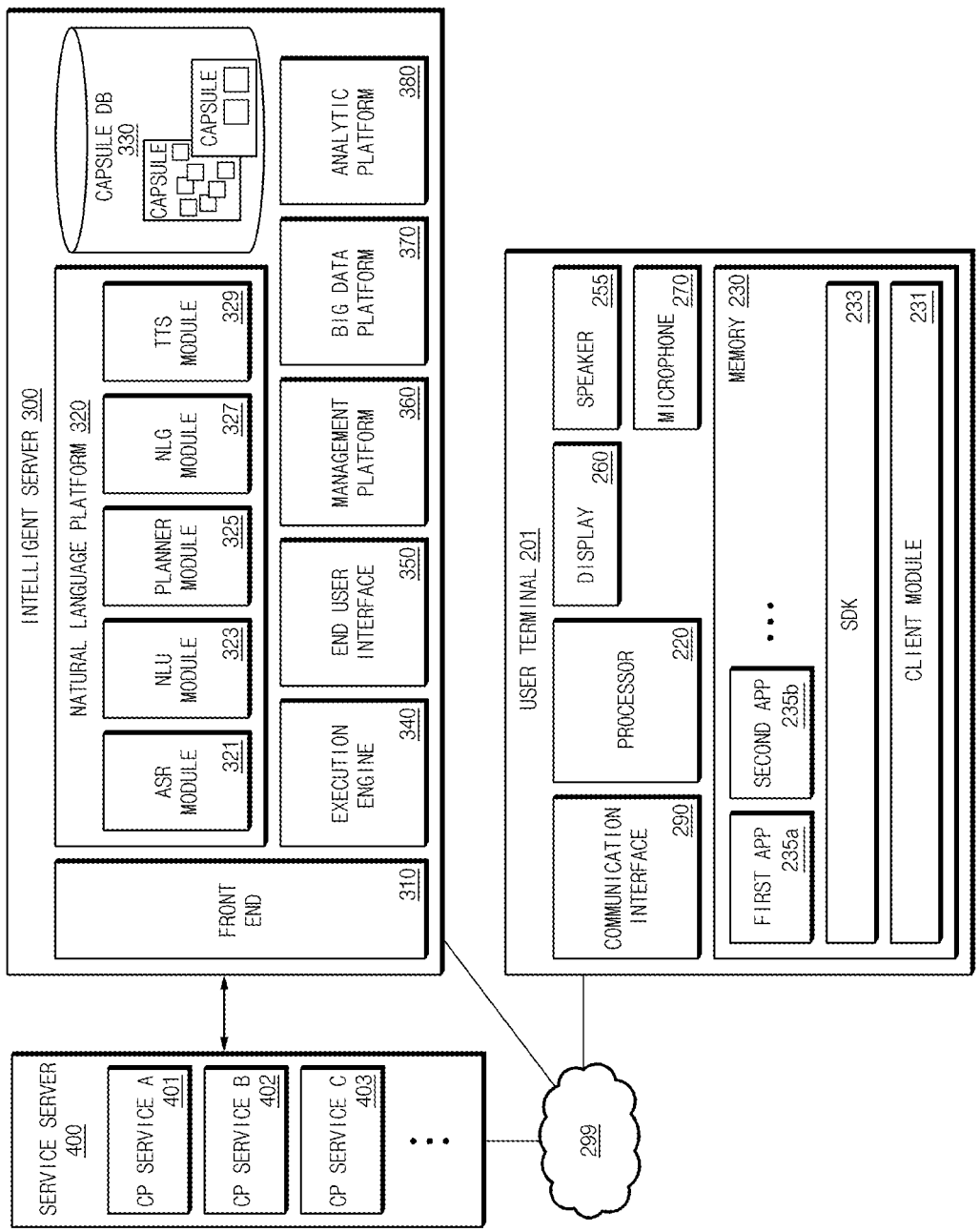
FIG. 2 is a block diagram illustrating an example integrated intelligence system according to various embodiments.

FIG. 2 is a block diagram illustrating an example integrated intelligence system according to various embodiments.

Referring to FIG. 2, an integrated intelligence system of an embodiment may include a user terminal 201, an intelligence server 300, and a service server 400.

The user terminal 201 (e.g., the electronic device 101 of FIG. 1) may be a terminal device (or an electronic device) connectable to the Internet, such as a mobile phone, a smartphone, a personal digital assistant (PDA), a laptop computer, a television (TV), white goods, a wearable device, a head mounted device (HMD), or a smart speaker.

According to an embodiment, the user terminal 201 may include a communication interface 290, a microphone 270, a speaker 255, a display 260, a memory 230, and/or a processor 220. The above elements may be operatively or electrically connected to each other.

The communication interface 290 (e.g., the communication module 190 of FIG. 1) may be connected to an external device to transmit/receive data. The microphone 270 (e.g., the audio module 170 of FIG. 1) may receive a sound (e.g., a user utterance) and may convert the sound into an electric signal. The speaker 255 (e.g., the sound output module 155 of FIG. 1) may output an electric signal as a sound (e.g., a voice). The display 260 (e.g., the display module 160 of FIG. 1) may be configured to display an image or video. In an embodiment, the display 260 may also display a graphic user interface (GUI) of an executed app (or an application program).

The memory 230 (e.g., the memory 130 of FIG. 1) of an embodiment may store a client module 231, a software development kit (SDK) 233, and a plurality of applications. The client module 231 and the SDK 233 may provide or be part of a framework (or a solution program) for executing a general-purpose function. Furthermore, the client module 231 or the SDK 233 may provide or be part of a framework for processing a voice input.

The plurality of applications (e.g., 235a, 235b) may be programs for executing a specified function. According to an embodiment, the plurality of applications may include a first app 235a and/or a second app 235b. According to an embodiment, each of the plurality of applications may include a plurality of operations for executing a specified function. For example, the applications may include an alarm app, a message app, and/or a schedule app. According to an embodiment, the plurality of applications may be executed by the processor 220 to sequentially perform at least a portion of the plurality of operations.

The processor 220 (e.g., including processing circuitry) of an embodiment may control overall operation of the user terminal 201. For example, the processor 220 may be electrically connected to the communication interface 290, the microphone 270, the speaker 255, and the display 260 to perform a specified operation. For example, the processor 220 may include at least one processor.

The processor 220 of an embodiment may execute the programs stored in the memory 230 to execute a specified function. For example, the processor 220 may execute at least one of the client module 231 or the SDK 233 to perform the following operations for processing a voice input. The processor 220, for example, may control operation of the plurality of applications through the SDK 233. The following operations described as operations of the client module 231 or the SDK 233 may be operations performed by operation of the processor 220.

In an embodiment, the client module 231 may receive a voice input. For example, the client module 231 may receive a voice input corresponding to a user utterance detected through the microphone 270. The client module 231 may transmit the received voice input (e.g., a voice signal) to the intelligence server 300. The client module 231 may transmit, to the intelligence server 300, state information about the user terminal 201 together with the received voice input. The state information may be, for example, execution state information about an app.

In an embodiment, the client module 231 may receive, from the intelligence server 300, a result corresponding to the received voice input. For example, the client module 231 may receive a result corresponding to the received voice input when the intelligence server 300 is capable of calculating or determining the result corresponding to the received voice input. The client module 231 may display the received result on the display 260.

In an embodiment, the client module 231 may receive a plan corresponding to the received voice input. The client module 231 may display, on the display 260, results of performing a plurality of operations of an app according to the plan. The client module 231, for example, may sequentially display the results of performing a plurality of operations on the display 260. For another example, the user terminal 201 may display, on the display 260, only a portion of the results (e.g., result of performing a last operation) of performing a plurality of operations.

According to an embodiment, the client module 231 may receive, from the intelligence server 300, a request for obtaining information required for calculating or determining a result corresponding to a voice input. According to an embodiment, the client module 231 may transmit the required information to the intelligence server 300 in response to the request.

In an embodiment, the client module 231 may transmit, to the intelligence server 300, result information about results of performing a plurality of operations according to the plan. The intelligence server 300 may confirm that the received voice input has been correctly performed, using the result information.

In an embodiment, the client module 231 may include a voice recognition module. According to an embodiment, the client module 231 may recognize, through the voice recognition module, a voice input for executing a limited function. For example, the client module 231 may execute an intelligence app for processing a voice input by performing a systematic operation in response to a specified voice input (e.g., Wake up!).

In an embodiment, the intelligence server 300 may receive information related to a user voice input from the user terminal 201 via a network 299 (e.g., the first network 198 and/or second network 199 of FIG. 1). According to an embodiment, the intelligence server 300 may convert data related to a received voice input into text data. According to an embodiment, the intelligence server 300 may generate, based on the text data, at least one plan for performing a task corresponding to the user voice input.

According to an embodiment, the plan may be generated by an artificial intelligence (AI) system. The artificial intelligence system may be a rule-based system or a neural network-based system (e.g., a feedforward neural network (FNN) and/or a recurrent neural network (RNN)). Alternatively, the artificial intelligence system may be a combination of the foregoing systems or other artificial intelligence systems. According to an embodiment, the plan may be selected from a set of predefined plans or may be generated in real time in response to a user request. For example, the artificial intelligence system may select at least one plan from among a plurality of predefined plans.

In an embodiment, the intelligence server 300 may transmit a result according to a generated plan to the user terminal 201, or may transmit the generated plan to the user terminal 201. According to an embodiment, the user terminal 201 may display, on the display 260, a result according to a plan. According to an embodiment, the user terminal 201 may display, on the display 260, a result of performing an operation according to a plan.

The intelligence server 300 of an embodiment may include a front end 310, a natural language platform 320, a capsule database 330, an execution engine 340, an end user interface 350, a management platform 360, a big data platform 370, or an analytic platform 380.

In an embodiment, the front end 310 may receive, from the user terminal 201, a voice input received by the user terminal 201. The front end 310 may transmit a response corresponding to the voice input to the user terminal 201.

According to an embodiment, the natural language platform 320 may include an automatic speech recognition (ASR) module 321, a natural language understanding (NLU) module 323, a planner module 325, a natural language generator (NLG) module 327, and/or a text-to-speech (TTS) module 329.

In an embodiment, the automatic speech recognition module 321 may convert a voice input received from the user terminal 201 into text data. In an embodiment, the natural language understanding module 323 may recognize an intent of a user using the text data of the voice input. For example, the natural language understanding module 323 may recognize the intent of the user by performing syntactic analysis and/or semantic analysis. In an embodiment, the natural language understanding module 323 may recognize a meaning of a word extracted from a voice input using a linguistic feature (e.g., syntactic element) of a morpheme or phrase, and may match the recognized meaning to an intent to determine the intent of the user.

In an embodiment, the planner module 325 may generate a plan using the intent and parameter determined by the natural language understanding module 323. According to an embodiment, the planner module 325 may determine a plurality of domains required for performing a task, based on the determined intent. The planner module 325 may determine a plurality of operations included in each of the plurality of domains determined based on the intent. According to an embodiment, the planner module 325 may determine parameters required for performing the plurality of determined operations or result values output by performing the plurality of operations. The parameters and the result values may be defined as a concept of a specified form (or class). Accordingly, the plan may include a plurality of operations and/or a plurality of concepts determined according to the intent of the user. The planner module 325 may determine relationships between the plurality of operations and the plurality of concepts in stages (or hierarchically). For example, the planner module 325 may determine, based on the plurality of concepts, an execution order of the plurality of operations determined based on the intent of the user. In other words, the planner module 325 may determine the execution order of the plurality of operations based on the parameters required for performing the plurality of operations and results output by performing the plurality of operations. Accordingly, the planner module 325 may generate a plan including association information (e.g., ontology) between the plurality of operations and the plurality of concepts. The planner module 325 may generate a plan using information stored in the capsule database 330, which stores a set of relationships between concepts and operations.

In an embodiment, the natural language generator module 327 may change specified information into a text form. The information changed into a text form may have a form of a natural language utterance. The text-to-speech module 329 of an embodiment may change text-form information into voice-form information.

According to an embodiment, a portion or all of functions of the natural language platform 320 may be implementable in the user terminal 201. For example, the user terminal 201 may include an automatic speech recognition module and/or a natural language understanding module. After recognizing a user voice command, the user terminal 201 may transmit text information corresponding to the recognized voice command to the intelligence server 300. For example, the user terminal 201 may include a text-to-speech module. The user terminal 201 may receive, from the intelligence server 300, text information and may output the received text information as a voice.

The capsule database 330 may store information about relationships between a plurality of operations and concepts corresponding to a plurality of domains. In an embodiment, a capsule may include a plurality of action objects (or action information) and/or concept objects (or concept information) included in a plan. According to an embodiment, the capsule database 330 may store a plurality of capsules in a form of a concept action network (CAN). According to an embodiment, the plurality of capsules may be stored in a function registry included in the capsule database 330.

The capsule database 330 may include a strategy registry, which stores strategy information required when determining a plan corresponding to a voice input. The strategy information may include reference information for determining one plan when there are a plurality of plans corresponding to a voice input. According to an embodiment, the capsule database 330 may include a follow-up registry, which stores follow-up operation information for suggesting a follow-up operation to the user in a specified situation. The follow-up operation may include, for example, a follow-up utterance. According to an embodiment, the capsule database 330 may include a layout registry, which stores layout information about information output through the user terminal 201. According to an embodiment, the capsule database 330 may include a vocabulary registry, which stores vocabulary information included in capsule information. According to an embodiment, the capsule database 330 may include a dialog registry, which stores dialog information about a dialog (or interaction) with the user. The capsule database 330 may update a stored object through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for editing a follow-up utterance that activates a follow-up objective and provides a hint. The follow-up objective may be determined based on a currently set objective, user's preference, or environmental condition. In an embodiment, the capsule database 330 may also be implemented in the user terminal 201.

In an embodiment, the execution engine 340 may calculate a result using the generated plan. The end user interface 350 may transmit the calculated result to the user terminal 201. Accordingly, the user terminal 201 may receive the result and may provide the received result to the user. In an embodiment, the management platform 360 may manage information used in the intelligence server 300. In an embodiment, the big data platform 370 may collect data of the user. In an embodiment, the analytic platform 380 may manage quality of service (QoS) of the intelligence server 300. For example, the analytic platform 380 may manage elements and a processing speed (or efficiency) of the intelligence server 300.

In an embodiment, the service server 400 may provide a specified service (e.g., food order or hotel reservation) to the user terminal 201. According to an embodiment, the service server 400 may be a server operated by a third party. In an embodiment, the service server 400 may provide, to the intelligence server 300, information for generating a plan corresponding to a received voice input. The provided information may be stored in the capsule database 330. Furthermore, the service server 400 may provide result information according to a plan to the intelligence server 300. The service server 400 may communicate with the intelligence server 300 and/or the user terminal 201 via the network 299. The service server 400 may communicate with the intelligence server 300 via a separate connection. Although FIG. 2 illustrates the service server 400 as a single server, embodiments of the present disclosure are not limited thereto. At least one of services (401, 402, and 403) of the service server 400 may be implemented as a separate server.

In the above-described integrated intelligence system, the user terminal 201 may provide various intelligent services to the user in response to a user input. The user input may include, for example, an input via a physical button, a touch input, or a voice input.

In an embodiment, the user terminal 201 may provide a voice recognition service through an intelligence app (or a voice recognition app) stored in the user terminal 100. In this case, for example, the user terminal 201 may recognize a user utterance or voice input received through the microphone 270, and may provide a service corresponding to a recognized voice input to the user.

In an embodiment, the user terminal 201 may perform, based on a received voice input, a specified operation alone or in combination with the intelligence server 300 and/or the service server 400. For example, the user terminal 201 may execute an app corresponding to the received voice input, and may perform the specified operation through the executed app.

In an embodiment, when the user terminal 201 provides a service in combination with the intelligence server 300 and/or the service server 400, the user terminal 201 may detect a user utterance using the microphone 270, and may generate a signal (or voice data) corresponding to the detected user utterance. The user terminal 201 may transmit the voice data to the intelligence server 300 using the communication interface 290.

In an embodiment, the intelligence server 300 may generate, as a response to a voice input received from the user terminal 201, a plan for performing a task corresponding to the voice input or a result of performing an operation according to the plan. The plan may include, for example, a plurality of operations for performing a task corresponding to a user voice input and/or a plurality of concepts related to the plurality of operations. The concepts may refer, for example, to definitions of parameters input for performing the plurality of operations or result values output by performing the plurality of operations. The plan may include association information between the plurality of operations and/or the plurality of concepts.

In an embodiment, the user terminal 201 may receive the response using the communication interface 290. The user terminal 201 may output a voice signal generated in the user terminal 201 to the outside using the speaker 255, or may output an image generated in the user terminal 201 to the outside using the display 260.

Figure 3:
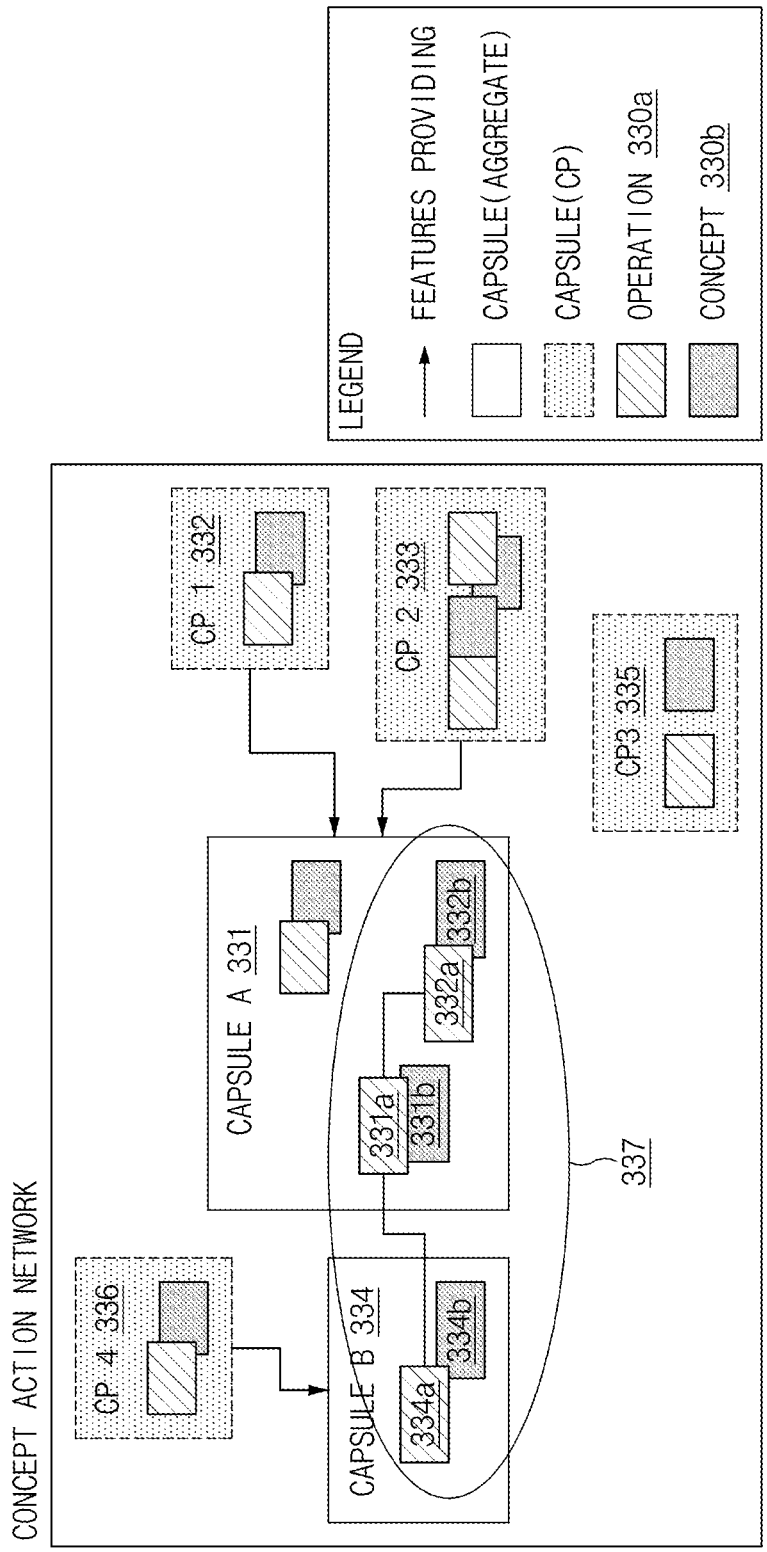
FIG. 3 is a diagram illustrating example relationship information between a concept and an action stored in a database according to various embodiments.

FIG. 3 is a diagram illustrating example relationship information between a concept and an operation stored in a database according to various embodiments.

The capsule database (e.g., the capsule database 330) of the intelligence server 300 may store capsules in a form of a CAN. The capsule database may store an operation for performing a task corresponding to a user voice input and a parameter required for the operation in a form of a CAN.

The capsule database may store a plurality of capsules (capsule A 331, capsule B 334) corresponding to a plurality of domains (e.g., applications) respectively. According to an embodiment, a single capsule (e.g., capsule A 331) may correspond to a single domain (e.g., location (geo), application). Furthermore, a capsule (e.g., CP 1 (332), CP2 (333), CP 3 (335), and/or CP 4 (336) of at least one service provider for executing a function for a domain related to one capsule may correspond to the one capsule. According to an embodiment, a single capsule may include at least one operation 330a and at least one concept 330b for executing a specified function.

The natural language platform 320 may generate a plan for performing a task corresponding to a received voice input using a capsule stored in the capsule database 330. For example, the planner module 325 of the natural language platform may generate a plan using a capsule stored in the capsule database. For example, the planner module 325 may generate a plan 337 using operations 331a and 332a and concepts 331b and 332b of the capsule A 331 and an operation 334a and concept 334b of the capsule B 334.

Figure 4:
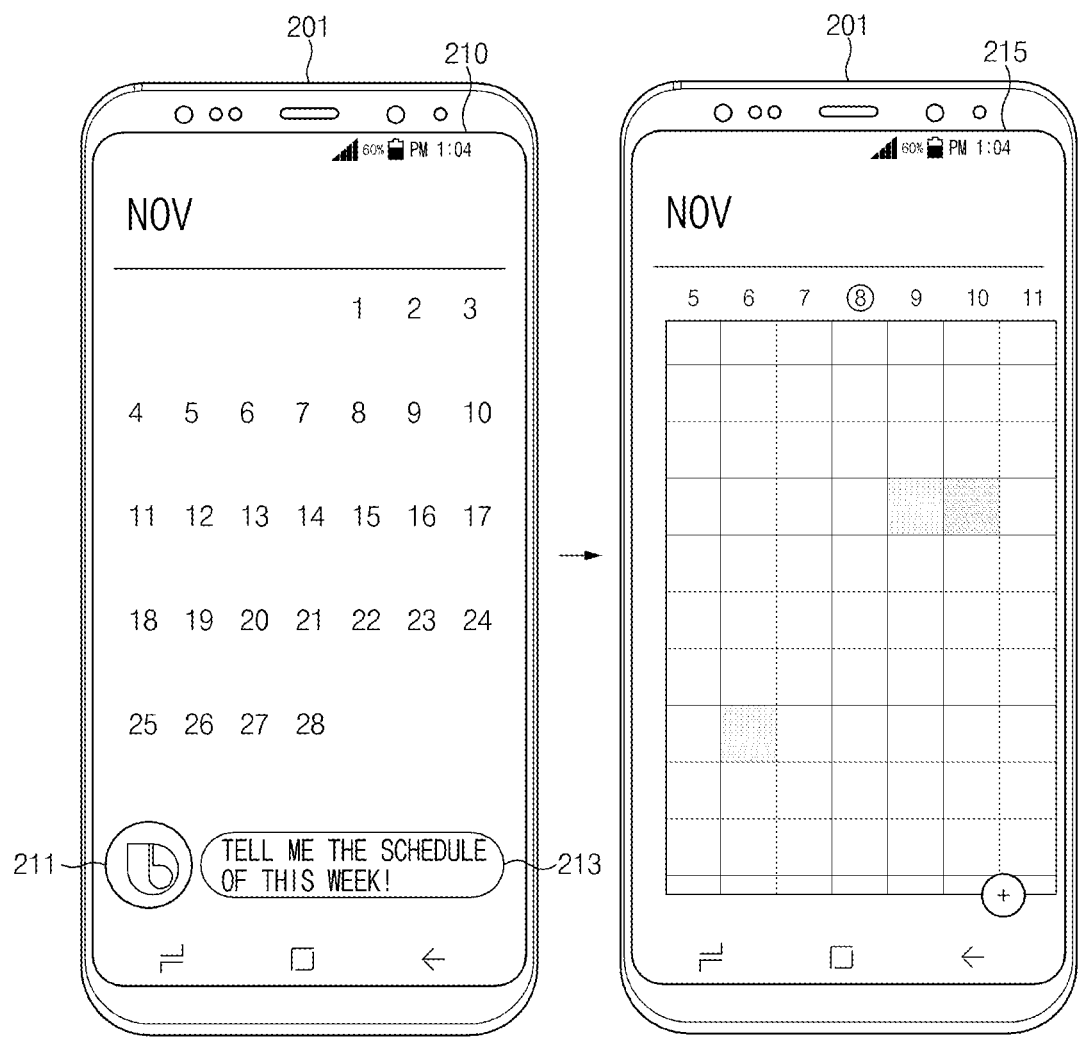
FIG. 4 is a diagram illustrating an example user terminal which displays a screen in which a voice input received through an intelligence app is processed according to various embodiments.

FIG. 4 is a diagram illustrating an example screen in which a voice input received through an intelligence app is processed by a user terminal according to various embodiments.

The user terminal 201 may execute an intelligence app for processing a user input through the intelligence server 300.

According to an embodiment, in a first screen 210, when the user terminal 201 has recognized a specified voice input (e.g., Wake up!) or has received an input via a hardware key (e.g., dedicated hardware key), the user terminal 201 may execute an intelligence app for processing a voice input. The user terminal 201, for example, may execute an intelligence app in a state in which a schedule app has been executed. According to an embodiment, the user terminal 201 may display, on the display 260, an object (e.g., an icon) 211 corresponding to an intelligence app. According to an embodiment, the user terminal 201 may receive a voice input caused by a user utterance. For example, the user terminal 201 may receive a voice input "Tell me the schedule of this week!". According to an embodiment, the user terminal 201 may display, on the display, a user interface (UI) 213 (e.g., input window) of an intelligence app on which text data of the received voice input is displayed.

According to an embodiment, in a second screen 215, the user terminal 201 may display, on the display, a result corresponding to the received voice input. For example, the user terminal 201 may receive a plan corresponding to a received user input, and may display "schedule of this week" on the display according to the plan.

Figure 5:
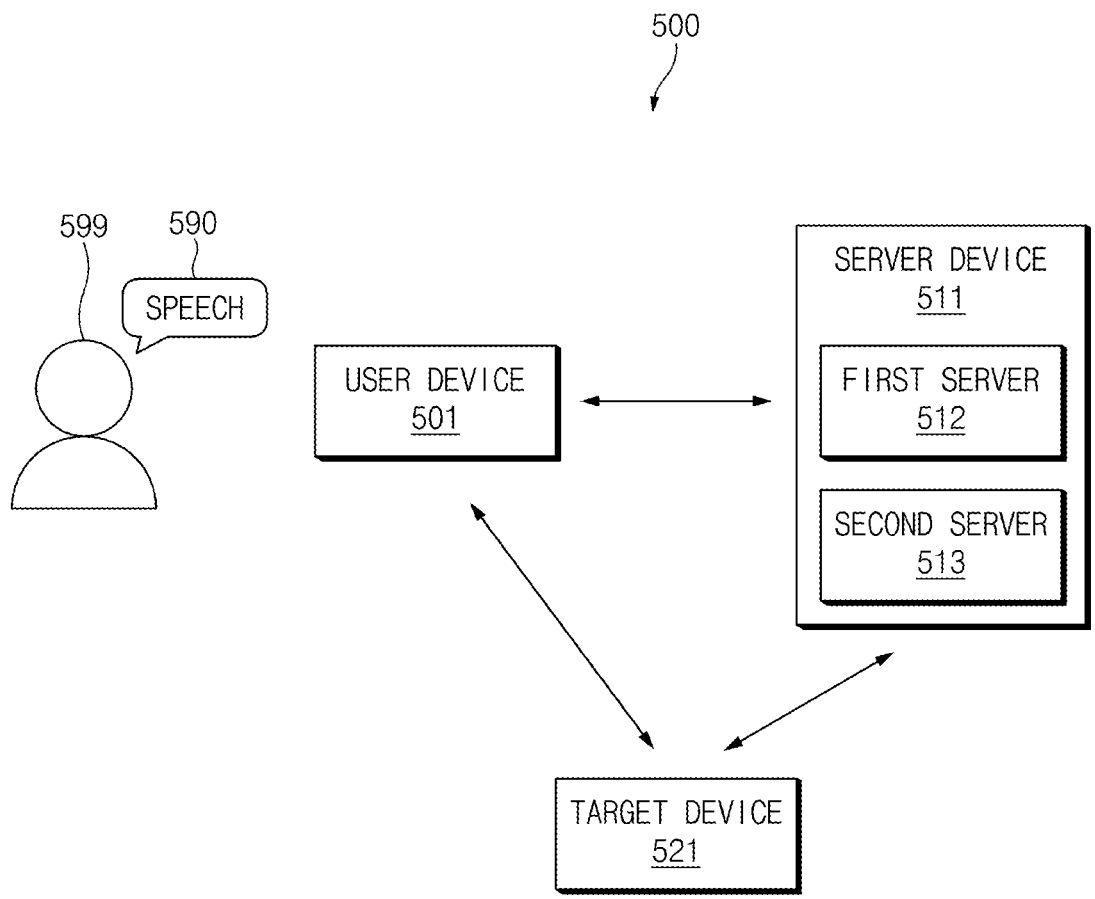
FIG. 5 illustrates an example system for controlling a target device based on an utterance according to various embodiments.

FIG. 5 illustrates an example system for controlling a target device based on an utterance according to various embodiments.

Referring to FIG. 5, a system 500 may include a user device 501, a server device 511, and a target device 521.

The user device 501 may be referred to as a listener device that receives an utterance 590 of a user 599, and may include configurations similar to those of the user terminal 201 of FIG. 2 or the electronic device 101 of FIG. 1. The user device 501 may include a voice assistant (e.g., the client module 231 of FIG. 2). The user device 501 may be configured to receive the utterance 590 of the user 599 using a voice reception circuit (e.g., the audio module 170 of FIG. 1) and transmit utterance data corresponding to the utterance 590 to the server device 511. For example, the user device 501 may be configured to transmit the utterance data to the server device 511 via a network such as Internet.

The target device 521 may be referred to as a device to be controlled by the utterance 590, and may include configurations similar to those of the electronic device 101 of FIG. 1. In various embodiments of the disclosure, although the target device 521 is described as an object to be controlled, the target device 521 may also include a voice assistant like the user device 501. In an embodiment, the target device 521 may be configured to receive control data from the server device 511 via a network such as Internet and perform an operation according to the control data. In an example, the target device 521 may be configured to receive control data from the user device 501 (for example, using a short-range network (e.g., NFC, WiFi, LAN, Bluetooth, or D2D) or RF signal) and perform an operation according to the control data.

The server device 511 may include at least one server device. For example, the server device 511 may include a first server 512 and a second server 513. The server device 511 may be configured to receive utterance data from the user device 501 and process the utterance data. For example, the first server 512 may correspond to the intelligence server 300 of FIG. 2. The second server 513 may include a database for an external electronic device 521 (e.g., target device). The second server 513 may be referred to as an Internet-of-things (IoT) server. For example, the second server 513 may include components for storing information (e.g., identifier, group information, or the like of an external electronic device) of an external electronic device and controlling the external electronic device. The first server 512 may determine an intent of the user 599 included in received speech data by processing the received utterance data. When the intent of the user 599 is to control an external device (e.g., the target device 521), the first server 512 may identify the target device 521 to be controlled using data of the second server 513, and may control the identified target device 521 so that the target device 521 performs an operation according to the intent. Although FIG. 5 illustrates the first server 512 and the second server 513 as separate configurations, the first server 512 and the second server 513 may be implemented as a single server.

The configuration of the system 500 illustrated in FIG. 5 is an example, and embodiments of the present disclosure are not limited thereto. Various methods for controlling the target device 521 may be included in embodiments of the disclosure.

In an example, utterance data (e.g., speech data) transmitted from the user device 501 to the server device 511 may have any file format in which a voice is recorded. In this case, the server device 511 may determine the intent of the user 599 for the utterance data through voice recognition and natural language analysis on the utterance data. In another example, the utterance data transmitted from the user device 501 to the server device 511 may include a voice recognition result corresponding to the utterance 590. In this case, the user device 501 may perform automatic voice recognition on the utterance 590 and may transmit an automatic voice recognition result to the server device 511 as utterance data. The server device 511 may determine the intent of the user 599 for the utterance data through natural language analysis on the utterance data.

In an embodiment, the target device 521 may be controlled based on a signal from the server device 511. When the intent of the user 599 is to control the target device 521, the server device 511 may transmit control data to the target device 521 so as to make the target device 521 perform an operation according to the intent. In an example, the target device 521 may be controlled based on a signal from the user device 501. When the intent of the user 599 is to control the target device 521, the server device 511 may transmit information for controlling the target device 521 to the user device 501. The user device 501 may control the target device 521 using the information received from the server device 511.

In an example, the user device 501 may be configured to perform automatic voice recognition and natural language understanding. The user device 501 may be configured to identify, by itself, the intent of the user 599 from the utterance 590. In this case, the user device 501 may identify the target device 521 using information stored in the second server 513, and may control the target device 521 according to an intent. The user device 501 may control the target device 521 via the second server 513 or may control the target device 521 by directly transmitting a signal to the target device 521.

In an embodiment, the system 500 may not include the server device 511. For example, the user device 501 may be configured to perform all of the above-described operations of the server device 511. In this case, the user device 501 may be configured to identify the intent of the user 599 from the utterance 590, identify the target device 521 corresponding to the intent from an internal database, and directly control the target device 521.

The various examples described above with reference to FIG. 5 are examples of controlling the target device 521 based on an utterance, and embodiments of the present disclosure are not limited thereto. A person skilled in the art could understand that the control methods of the present disclosure may be performed using the system of the examples described above with reference to FIG. 5.

Figure 6:
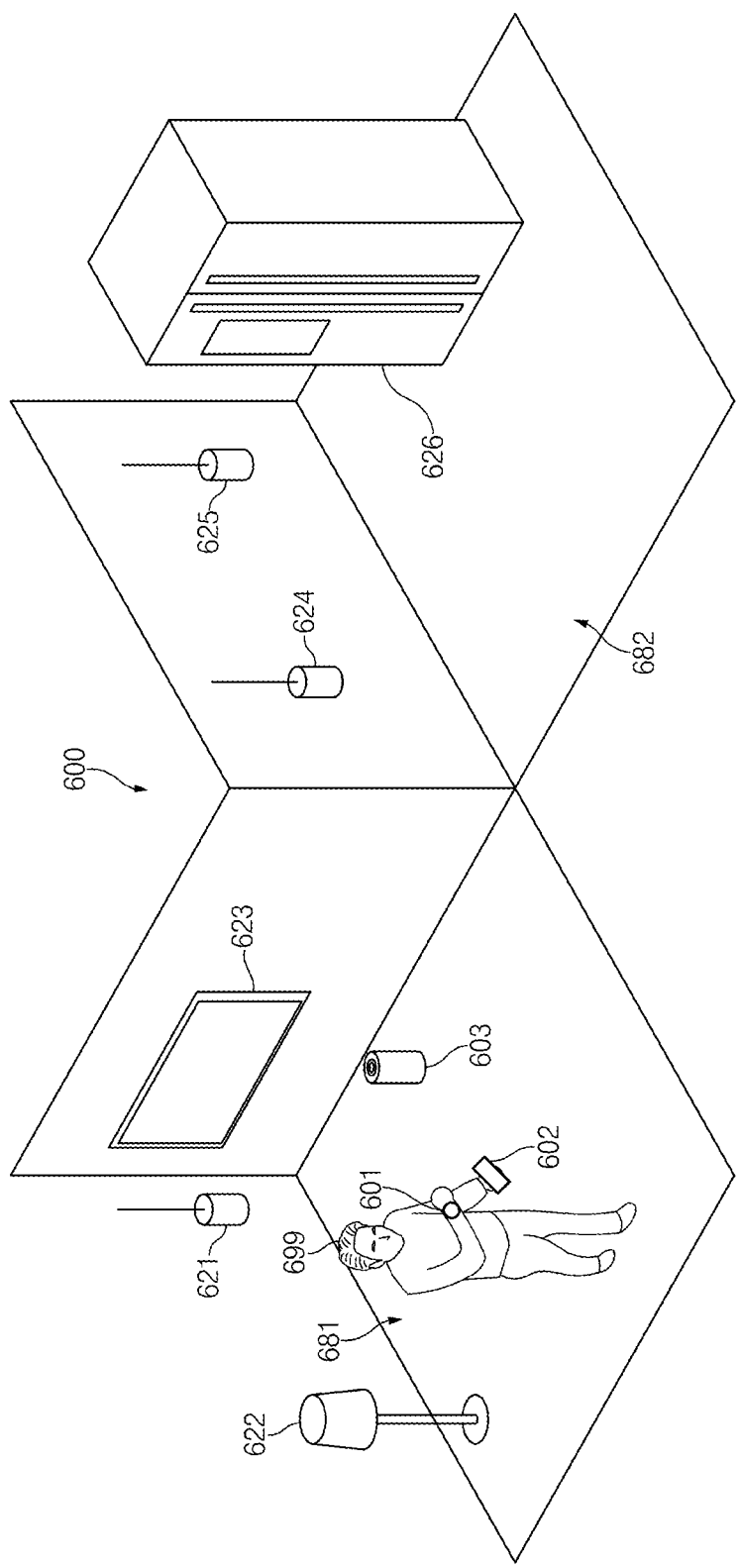
FIG. 6 illustrates an example multi-device environment according to various embodiments.

FIG. 6 illustrates an example multi-device environment according to various embodiments.

Referring to FIG. 6, an illustrative multi-device environment 600 may include at least one listener device and at least one target device (e.g., device to be controlled).

For example, a smart watch 601, a mobile phone 602, and an AI speaker 603 each may correspond to the user device 501 of FIG. 5. The user 699 may use a voice assistant provided to the smart watch 601, the mobile phone 602, or the AI speaker 603 to control another device. For example, the user 699 may control the other device by calling the voice assistant through a wake-up utterance or a user input (e.g., button input or touch input) to a listener device and giving a speech for controlling the other device.

For example, a first lamp 621, a second lamp 624, a third lamp 625, a light stand 622, a TV 623, and a refrigerator 626 each may correspond to the target device 521 of FIG. 5. In the example of FIG. 6, it may be assumed that the first lamp 621, the light stand 622, and the TV 623 are located in a living room 681, and the second lamp 624, the third lamp 625, and the refrigerator 626 are located in a kitchen 682.

In an example, the user 699 may give a voice command using the voice assistant of the mobile phone 602. For example, the user 699 may give the following speech. "Turn on the living room lamp." Since the first lamp 621 and the light stand 622 are located in the living room 681, it may be difficult to find out which lamp is intended by the user 699.

Embodiments of the disclosure may provide a method for collecting information of devices that may become objects to be controlled and providing the user 699 with a hint (i.e., a notification) for a target device to be controlled. For the disclosure, the term "hint" can be referred as the term "notification". For example, the hint may include location information of devices that may become objects to be controlled. In response to the utterance of the user 699, the mobile phone 602 may provide the hint for determining a target device to the user. Since the hint is provided based on the location information, the user device 699 may intuitively determine a target device. For example, the hint may be directly provided to the user via devices, which can be devices to be controlled. By performing different operations for each of devices, which can be a device to be controlled, the user 699 may intuitively identify candidate target devices and determine a target device.

Hereinafter, example methods for identifying a target device according to various embodiments will be described in detail with reference to FIGS. 7 to 15. In various embodiments of the present disclosure, controlling, by a specified device, another device may include direct control and indirect control. For example, controlling the TV 623 by the mobile phone 602 may include both of controlling, by the mobile phone 602, the TV 623 by directly sending a signal to the TV 623 and controlling, by the mobile phone 602, the TV via an external device (e.g., the server device 511 of FIG. 5).

Figure 7:
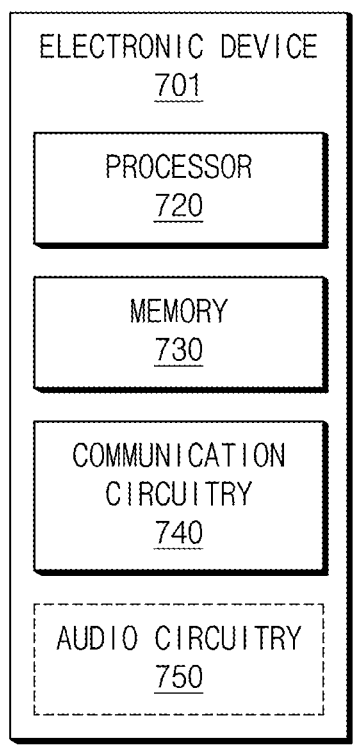
FIG. 7 is a block diagram of an example electronic device according to various embodiments.

FIG. 7 is a block diagram of an example electronic device according to various embodiments.

Referring to FIG. 7, according to an embodiment, an electronic device 701 may include a processor 720 (e.g., the processor 120 of FIG. 1), a memory 730 (e.g., the memory 130 of FIG. 1), and/or communication circuitry 740 (e.g., the communication module 190 of FIG. 1). For example, the electronic device 701 may further include audio circuitry 750 (e.g., the audio module 170 of FIG. 1), and may further include other components not shown in FIG. 7. For example, the electronic device 701 may further include at least some of the components of the electronic device 101 of FIG. 1.

In various embodiments of the disclosure, the electronic device 701 may be referred to as a device that identifies and/or determines a target device (e.g., the target device 521 of FIG. 5). For example, when identification and/or determination of a target device is performed by a server device (e.g., the server device 511 of FIG. 5), the electronic device 701 may be referred to as a server device. For example, when identification and/or determination of a target device is performed by a user device (e.g., the user device 501 of FIG. 5), the electronic device 701 may be referred to as a user device. As described above, a target device may be controlled using another device after the target device is identified. Therefore, the electronic device 701 may directly control the target device or may indirectly control the target device via another device.

The processor 720 (e.g., including processing circuitry) may be electrically, operatively, or functionally connected to the memory 730, the communication circuitry 740, and/or the audio circuitry 750. The memory 730 may store instructions. The instructions, when executed by the processor 720, may cause the electronic device 701 to perform various operations.

According to an embodiment, the electronic device 701 may be configured to obtain location information and utterance data of a user and identify the type and a control function of the target device from the utterance data. For example, the electronic device 701 may obtain the location information (e.g., location of a listener device) and utterance data from an external electronic device (e.g., listener device) using the communication circuitry 740. For example, the electronic device 701 may be configured to obtain the utterance data and the location information of the electronic device 701 using the audio circuitry 750.

The electronic device 701 may be configured to identify a plurality of external electronic devices corresponding to the location information and the type. For example, the electronic device 701 may be configured to identify the plurality of external electronic devices corresponding to the type among external electronic devices associated with the user and belonging to a geographic region corresponding to the location information.

The electronic device 701 may be configured to provide relative location information between the plurality of external electronic devices to the user based on identification of the plurality of external electronic devices. The electronic device 701 may be configured to transmit a command for performing positioning to the plurality of external electronic devices using the communication circuitry 740, receive positioning information from the plurality of external electronic devices based on the command, and obtain the relative location information based on the positioning information.

The electronic device 701 may be configured to obtain, from the user, response utterance data including a response to the relative location information. For example, the electronic device 701 may obtain the response utterance data from an external electronic device using the communication circuitry 740. For example, the electronic device 701 may be configured to obtain the response utterance data using the audio circuitry 750. The relative location information may include information for distinguishing the plurality of external electronic devices based on a relative location. For example, the relative location information may include a location of a second external electronic device relative to a third external electronic device and a location of a first external electronic device relative to the third external electronic device. For example, the response utterance data may include information indicating the location of the second external electronic device relative to the third external electronic device or the location of the first external electronic device relative to the third external electronic device.

The electronic device 701 may be configured to determine, based on the response utterance data, a target device that is to perform the control function among the plurality of external electronic devices. For example, the electronic device 701 may be configured to determine, as the target device, an external electronic device corresponding to information about a relative location indicated by the response utterance data among the first external electronic device and the second external electronic device.

According to an embodiment, the electronic device 701 may be configured to provide a hint by controlling a candidate target device. For example, as described above, the electronic device 701 may identify a plurality of candidate electronic devices based on the utterance data of the user.

The electronic device 701 may be configured to identify a common function between the plurality of candidate electronic devices based on identification of the plurality of candidate electronic devices. For example, the electronic device 701 may obtain information about a supported function of each of the plurality of candidate electronic devices from an internal database or an external device. The electronic device 701 may identify, as the common function, a function commonly supported by the plurality of candidate electronic devices or a function belonging to a common category between the plurality of candidate electronic devices.

The electronic device 701 may be configured to provide a hint by differently controlling the identified common function for each of the plurality of candidate electronic devices. For example, the electronic device 701 may be configured to provide the hint by differently controlling a level of the common function for each of the plurality of electronic devices. For example, the level may be set based on at least one of color, brightness, volume, or channel.

The electronic device 701 may be configured to obtain, from the user, response utterance data including a response to the hint. For example, the electronic device 701 may obtain the response utterance data from an external electronic device using the communication circuitry 740. For another example, the electronic device 701 may be configured to obtain the response utterance data using the audio circuitry 750. In an embodiment, the electronic device 701 may be configured to provide a query based on the hint to the user after providing the hint. The electronic device 701 may be configured to obtain response utterance data that responds to the query. For example, the query may include information about a control state of at least a portion of the plurality of candidate electronic devices controlled to different states in order to provide the hint.

The electronic device 701 may be configured to determine, based on the response utterance data, a target device that is to perform the control function among the plurality of candidate electronic devices. The electronic device 701 may control the target device so that the target device performs the control function, using the communication circuitry 740. For example, the electronic device 701 may be configured to control the target device by directly or indirectly transmitting a signal that instructs execution of the control function to the target device using the communication circuitry 740.

Figure 8:
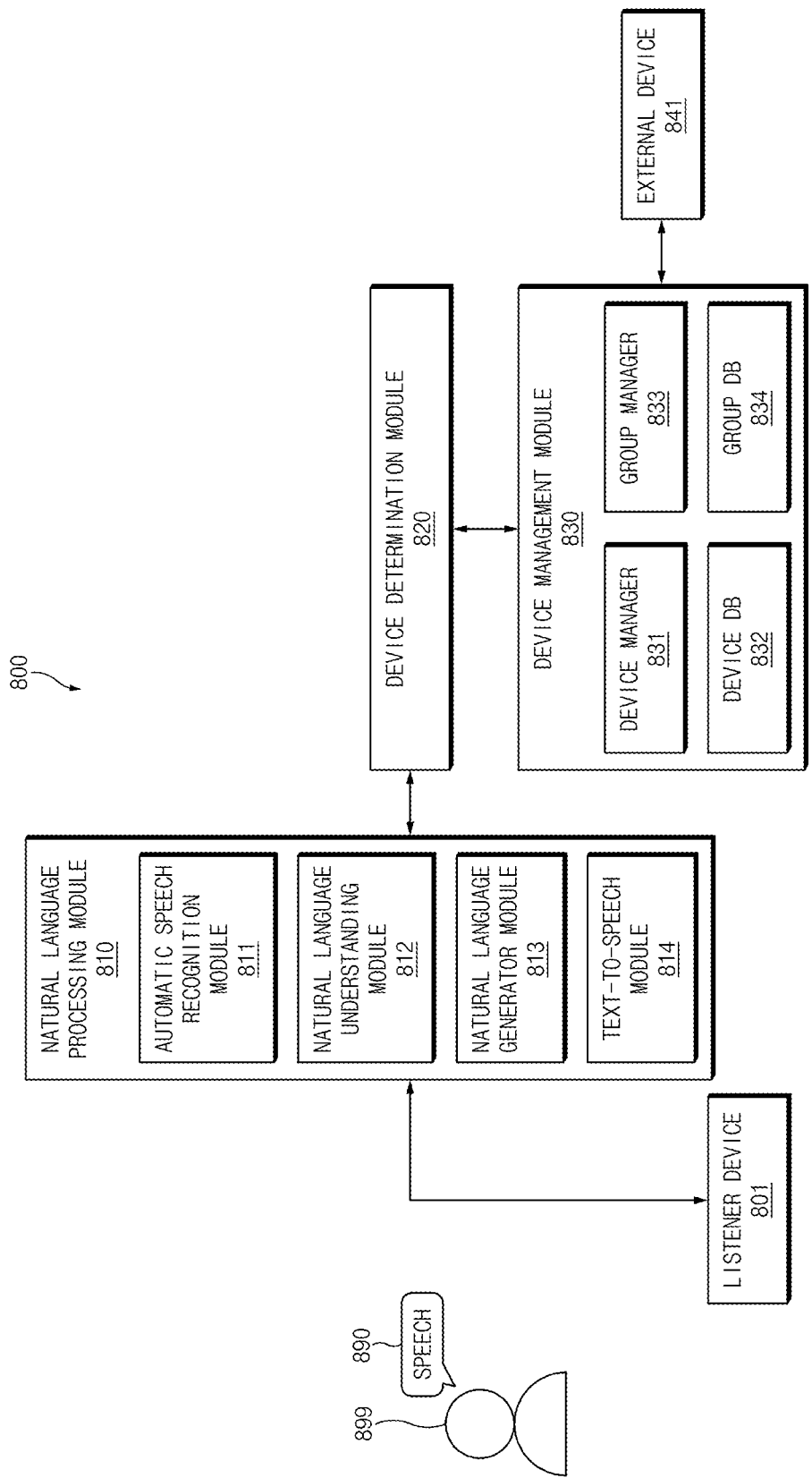
FIG. 8 illustrates an example system for controlling an external device according to various embodiments.

FIG. 8 illustrates an example system for controlling an external device according to various embodiments.

Referring to FIG. 8, a system 800 may include various modules for controlling an external device 841 based on an utterance 890 of a user 899. The term "module" in FIG. 8 may represent a software module or a hardware module or a module including a combination of hardware and software. In a case in which a module is a software module, this module may be implemented by executing instructions by a processor (e.g., the processor 720 of FIG. 7).

In an embodiment, a server device (e.g., the server device 511 of FIG. 5) may include a natural language processing module 810, a device determination module 820, and/or a device management module 830. The server device may include a plurality of servers. For example, the natural language processing module 810 and the device management module 830 may be implemented using different electronic devices.

A listener device 801, in which a voice assistant is installed, may receive the utterance 890 of the user 899 and may transmit utterance data corresponding to the utterance 890 to the server device (e.g., the first server 511 of FIG. 5). For example, the listener device 801 may activate a voice assistant application in response to a wake-up utterance, a button input, or a touch input, and may activate a microphone (e.g., the audio circuitry 750 of FIG. 7). The listener device 801 may transmit, to the server device, the utterance data corresponding to the utterance 890 received using the microphone. The listener device 801 may transmit information of the listener device 801 to the server device together with the utterance data. For example, the information of the listener device 801 may include an identifier of the listener device, a function list of the listener device, a listener device state (e.g., power state, playback state), and/or location information (e.g., latitude and longitude, connected access point (AP) state (e.g., service set identifier (SSID)), found AP information). The listener device 801 may provide the user 899 with a result processed by the server device via a speaker or a display. The result processed by the server device may include a natural language expression indicating a result of processing the utterance 890.

The natural language processing module 810 may identify a user intent based on utterance data received from the listener device 801. For example, the natural language processing module 810 may correspond to the intelligence server 300 (e.g., the first server 512 of FIG. 5) of FIG. 2. Although not illustrated in FIG. 8, the natural language processing module 810 may further include a front end (e.g., the front end 310 of FIG. 2).

The natural language processing module 810 may generate text data from utterance data by performing voice recognition on the utterance data using an automatic utterance recognition module 811 (e.g., the automatic utterance recognition module 321 of FIG. 2). The natural language processing module 810 may identify an intent from the text data using a natural language understanding module 812 (e.g., the natural language understanding module 323 of FIG. 2). For example, the natural language processing module 810 may identify an intent corresponding to the utterance 890 by comparing a plurality of predefined intents and the text data. Furthermore, the natural language processing module 810 may extract additional information from the utterance data. For example, the natural language processing module 810 may perform slot tagging or slot filling by extracting a word (e.g., entity) included in the utterance data.

The natural language processing module 810 may provide the user with feedback (e.g., response) to the utterance 890 using the natural language generator module 813 (e.g., the natural language generator module 327 of FIG. 2). For example, the natural language generator module 813 may generate the feedback to be provided to the user as a natural language expression. A text-to-speech module 814 (e.g., the text-to-speech module 329 of FIG. 2) may convert the natural language expression generated by the natural language generator module 813 into voice data. The natural language processing module 810 may transmit the generated voice data to the listener device 801 to provide the user 899 with a response to the utterance 890.

The natural language processing module 810 may transfer an intent identified from the utterance 890 of the user 899 to the device determination module 820. For example, when the identified intent corresponds to control of an external device, the natural language processing module 810 may transfer the identified intent to the device determination module 820. The natural language processing module 810 may transfer the identified intent and extracted additional information (e.g., entity) to the device determination module 820.

The device determination module 820 may identify a candidate device and/or target device (e.g., external device 841) capable of performing the intent of the user 899 using information (intent and/or additional information) received from the natural language processing module 810. The device determination module 820 may identify a target device or a candidate target device using information stored in the device management module 830. The device determination module 820 may obtain location information (e.g., latitude and longitude, location information, geo-fence information, and connected AP information (e.g. SSID) of the listener device 801) of the listener device 801 from the listener device 801 or via another device. The device determination module 820 may identify a target device or a candidate target device using the location information of the listener device 801 and information (intent and/or additional information) received from the natural language processing module 810.

The device management module 830 may be configured to store and/or manage information about a device (e.g., IoT device) that may become an object to be controlled. The device management module 830 may be referred to as an IoT server, and may be implemented in the same server device as the device determination module 820 or may be implemented in a server device different from the device determination module 820. In an example, the device management module 830 may include a device manager 831, a device database (DB) 832, a group manager 833, and/or a group DB 834.

The device manager 831 may be configured to generate, modify, update, and/or delete information of devices stored in the device DB 832. The device DB 832 may store information (e.g., device information) of devices (e.g., external device 841). For example, device information may include at least one of supported function information, type information, identification information, or location information (e.g., latitude and longitude, geo-fence information, connected AP information (e.g., SSID)) about each device. The geo-fence information, for example, may include information about a plurality of regions logically divided based on a latitude and longitude or a plurality of regions logically divided based on information of APs. The supported function information, for example, may include information of a remotely controllable function supported by a device. The device information, for example, may include information about the type of a device (e.g., TV, speaker, lamp, refrigerator, etc.). The identification information of a device may include a device identifier of the device, a user identifier of a user (or account) associated with the device, and/or a group identifier of a group to which the device belongs. For example, the device identifier may be identification information set by the user of the device, identification information arbitrarily generated by the system 800, or identification information set by a manufacturer. For example, the user identifier may include an identifier set by the user, a name of the user, personal recognition information of the user, and/or a nickname of the user. For example, the group identifier may include identification information of a group to which a corresponding device belongs. The group identifier, for example, may be set by the user. The user may allocate a corresponding device to a group such as "home" or "company". The group may be defined by a hierarchical structure. For example, the group "home" may include sub-groups such as "kitchen" and "living room". For another example, the group identifier may be set by the system 800 based on a location. The system 800 (e.g., device management module 830) may receive location information from each device, and may set, as a single group, devices associated with the same user and located adjacent to each other. The system 800 may identify devices associated with the same user and connected to the same AP as the devices located adjacent to each other.

The group manager 833 may be configured to generate, modify, update, and/or delete a group using information stored in the group DB 834. The group DB 834 may store information about device groups for identifying a device corresponding to a user utterance. For example, the group DB 834 may include a group identifier, a device identifier list, a user identifier, and/or location information. The above descriptions provided in relation to the device DB 832 may be referenced with respect to the group identifier, the user identifier, and the location information. The device identifier list may include identifiers of devices belonging to one group.

According to an embodiment, the device determination module 820 may identify candidate target devices that may become objects to be controlled by the utterance 890. When a plurality of target devices are identified, the device determination module 820 may provide a hint for the candidate target devices to the user 899 and may identify a target device based on a response of the user 899 to the hint. For example, the device determination module 820 may generate a hint including location information using the natural language processing module 810 based on location information about the plurality of candidate target devices, and may provide the generated hint to the user 899 via the listener device 801. For example, the device determination module 820 may provide the hint to the user by controlling the plurality of candidate target devices. Example operations of the device determination module 820 will be described with reference to FIGS. 9 to 22.

In the above-described embodiment, the server device (e.g., the server device 511 of FIG. 5) is described as including the natural language processing module 810, the device determination module 820, and the device management module 830. In this case, the electronic device 701 described above with reference to FIG. 7 may be referred to as a server device. However, embodiments of the present disclosure are not limited thereto. A device that performs an operation (e.g., operation of the device determination module 820) for determining a target device may correspond to the electronic device 701 of FIG. 7. For example, in a case in which determination of a target device is performed by the listener device 801 (e.g., in the case where the device determination module 820 is included in the listener device 801), the electronic device 701 of FIG. 7 may be referred to as the listener device 801 or the user device 501 of FIG. 5.

Figure 9:
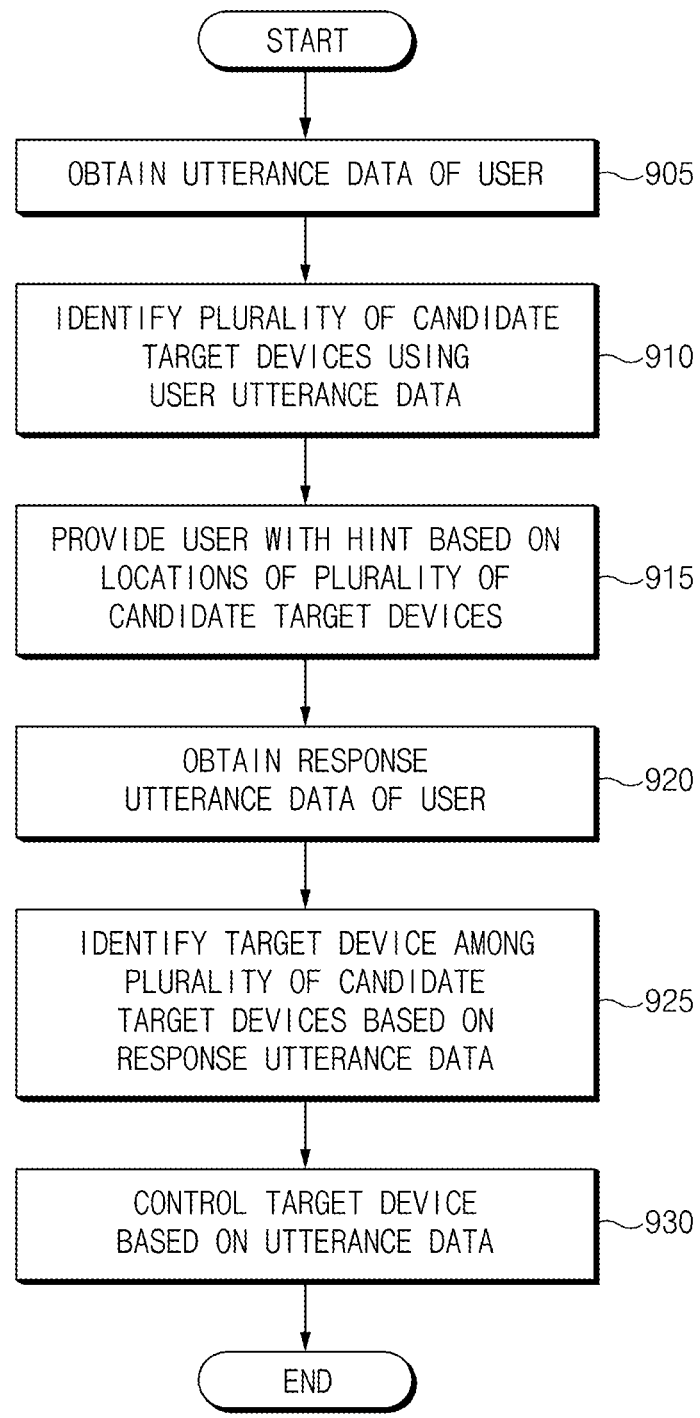
FIG. 9 is a flowchart illustrating an example method for controlling a target device according to various embodiments.

FIG. 9 is a flowchart illustrating an example method for controlling a target device according to various embodiments.

Referring to FIGS. 7 and 9, according to an embodiment, the electronic device 701 may identify a target device based on a response utterance of a user, and may control the identified target device.

In operation 905, the electronic device 701 may obtain utterance data of the user. In a case in which the electronic device 701 is a listener device, the electronic device 701 may directly obtain the utterance data from the user using the audio circuitry 750. In a case in which the electronic device 701 is a server device, the electronic device 701 may obtain the utterance data from a listener device. For example, the utterance data may include a speech about control of an external device. In the example of FIG. 9, the utterance data may be assumed to be "turn on the TV".

In operation 910, the electronic device 701 may identify a plurality of candidate target devices using the user utterance data. The electronic device 701 may identify an intent and/or parameter (e.g., entity) from the utterance data using the utterance data. The electronic device 701 may identify a group corresponding to a location of the user based on the location (e.g., location of a listener device) of the user. For example, the electronic device 701 may identify a group identifier of a group to which the location of the user belongs using the group DB 834 of FIG. 8. The electronic device 701 may identify external electronic devices belonging to the corresponding group using the device identifier list of the group DB 834. The electronic device 701 may obtain type information of identified external electronic devices using the device DB 832 of FIG. 8. The electronic device 701 may identify external electronic devices of the type corresponding to the utterance data as candidate target devices among the external electronic devices of the identified group.

In a case of "turn on the TV", the electronic device 701 may identify that the user is in a home based on the location of the user. For example, when the groups associated with the user are "home" and "company", the electronic device 701 may identify external electronic devices belonging to the group "home". The electronic device 701 may identify external electronic devices having the type corresponding to "TV" among the external electronic devices belonging to the group "home". In the example of FIG. 9, a plurality of TVs belonging to the group "home" may be identified. In this case, it may be difficult to identify a target device only using the utterance data. The electronic device 701 may identify a target device by providing a hint to the user. For example, operation 915 may be performed when a plurality of candidate target devices are identified. When one candidate target device is identified, the electronic device 701 may control the corresponding candidate target device so that the corresponding candidate target device performs an operation corresponding to the utterance.

In operation 915, the electronic device 701 may provide the user with a hint based on locations of the plurality of candidate target devices. In a case in which the electronic device 701 is a server device, the electronic device 701 may provide the hint via a listener device. As described above with reference to FIG. 8, the electronic device 701 may provide the hint by transmitting, to the listener device, voice data including a natural language expression corresponding to the hint. The electronic device 701 may provide the hint by transmitting, to the listener device, text data including a natural language expression corresponding to the hint. In a case in which the electronic device 701 is a listener device, the electronic device 701 may provide the hint using a speaker and/or display of the electronic device 701.

For example, in the example of FIG. 9, when a plurality of TVs are identified as candidate target devices, the electronic device 701 may request the user (e.g., by providing a hint) to provide additional information about which TV is desired to be controlled based on location information of the plurality of TVs. For example, in the group "home", one TV may belong to a sub-group "living room", and another TV may belong to a sub-group "kitchen". In this case, the electronic device 701 may provide the user with a hint such as "Do you want to turn on the living room TV? Or the kitchen TV?" The electronic device 701 may be configured to obtain group information of a TV using the group DB 834, and generate a natural language expression (e.g., using the natural language generator module 813 of FIG. 8) indicating a location of a TV based on the obtained group information of a TV.

For example, in the example of FIG. 9, when a plurality of TVs are identified as candidate target devices, the electronic device 701 may request the user (e.g., by providing a hint) to provide additional information about which TV is desired to be controlled based on location information, i.e., relative location information, of the plurality of TVs. For example, the electronic device 701 may identify relative locations of the plurality of TVs by controlling devices in the group to which the plurality of TVs belong.

The electronic device 701 may control the devices in the group so that the devices perform positioning. For example, the devices in the group may be configured to perform positioning according to a positioning method regulated by ultra-wideband (UWB), Bluetooth, WiFi, and/or WLAN. The positioning of devices may be performed when a utterance for controlling an external device is received from the user, may be performed at a preset interval, may be performed when a device is registered in a DB (e.g., the device DB 832 of FIG. 8), or may be performed at any point in time before the utterance is received. For example, the electronic device 701 may store map information including relative location information between devices.

For example, the devices in the group may be configured to measure a distance between the devices. The devices may be configured to measure, in response to an instruction from the electronic device 701, a distance between the devices based on time of flight (ToF) and/or round trip time (RTT), and report the measured distances to the electronic device 701. The electronic device 701 may identify distances of TVs to a specified device (e.g., refrigerator) based on the measured distances. For example, one TV may be close to a refrigerator, but another one TV may be relatively far from the refrigerator. In this case, the electronic device 701 may provide the user with a hint including relative location information of a candidate target device relative to another device, such as "Do you want to turn on the TV close to the refrigerator? Or the TV far from the refrigerator?"

For example, the devices in the group may be configured to measure a direction between the devices. The devices may measure, in response to an instruction from the electronic device 701, a direction (angle) between the devices based on angle of arrival (AoA) and/or angle of departure (AoD). The devices may be configured to report the measured directions to the electronic device 701. The electronic device 701 may identify directions of TVs to a specified device (e.g., refrigerator) based on the measured directions. For example, one TV may be located on a left side of the refrigerator, and another one TV may be located on a right side of the refrigerator. In this case, the electronic device 701 may provide the user with a hint including relative location information of a candidate target device relative to another device, such as "Do you want to turn on the TV on the left side of the refrigerator? Or the TV on the right side of the refrigerator?"

In operation 920, the electronic device 701 may obtain response utterance data of the user. The response utterance data may include a user's response to a provided hint. In a case in which the electronic device 701 is a server device, the electronic device 701 may obtain the response utterance data from a listener device. In a case in which the electronic device 701 is a listener device, the electronic device 701 may obtain the response utterance data using a microphone of the electronic device 701.

In operation 925, the electronic device 701 may identify a target device among the plurality of candidate target devices based on the response utterance data. The electronic device 701 may identify a user's intent and/or additional information (e.g., entity) included in the response utterance data through automatic utterance recognition and natural language understanding on the response utterance data. The electronic device 701 may identify which of the candidate target devices corresponds to a target device by comparing the hint provided to the user and the intent and/or additional information of the response utterance data. For example, the response utterance data may include one piece of information (e.g., location (e.g., place, distance and/or direction) of a specified device presented by the hint) among pieces of information (e.g., location information) about the plurality of candidate target devices provided by the hint. The electronic device 701 may identify, as a target device, a device indicated by the response utterance data or the hint and response utterance data.

For example, when the hint is "Do you want to turn on the living room TV? Or the kitchen TV?", the response utterance may be "Turn on the living room TV". In this case, the electronic device 701 may turn on power of the TV located in the living room.

For example, when the hint is "Do you want to turn on the TV close to the refrigerator? Or the TV far from the refrigerator?", the response utterance may be "Turn on the close TV". In this case, the electronic device 701 may turn on power of the TV located relatively close to the refrigerator.

For example, when the hint is "Do you want to turn on the TV on the left side of the refrigerator? Or the TV on the right side of the refrigerator?", the response utterance may be "Turn on the right TV". In this case, the electronic device 701 may turn on power of the TV located on the right side of the refrigerator.

In operation 930, the electronic device 701 may control a target device based on the utterance data. The electronic device 701 may perform an operation corresponding to the intent of the utterance data obtained in operation 905 using the identified target device. For example, the electronic device 701 may transmit a signal for performing an operation indicated by the utterance data to the identified target device directly or via another device.

In the example of FIG. 9, the response utterance data may be referred to as response data of the user. The response data may include a response through a user utterance or a user input (e.g., input through a display of a listener device).

Figure 10:
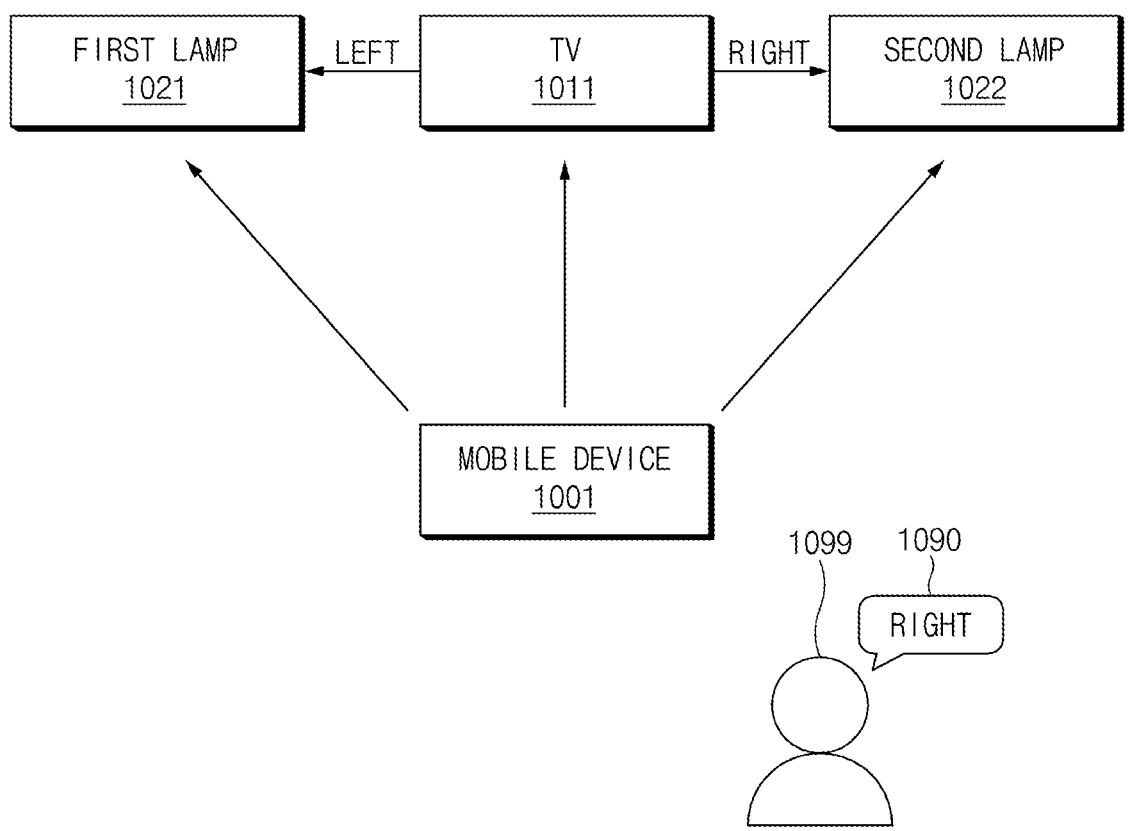
FIG. 10 illustrates an example method for identifying a target device based on a relative location according to various embodiments.

FIG. 10 illustrates an example method for identifying a target device based on a relative location according to various embodiments.

Referring to FIGS. 7 and 10, according to an embodiment, the electronic device 701 may provide a location-based hint in response to an utterance of a user 1099 who does not specify a location.

For example, the user 1099 may provide an utterance for controlling an external device using a mobile device 1001 as a listener device. For example, the utterance may be "Turn on the lamp". The electronic device 701, based on the utterance, may identify a first lamp 1021 and a second lamp 1022, which correspond (e.g., belong to a group corresponding to a location of the user 1099) to a location (e.g., location of the mobile device 1001) of the user 1099 and correspond to the type "lamp" of a control device of the utterance. The electronic device 701 may identify the first lamp 1021 and the second lamp 1022 as candidate target devices corresponding to the utterance.

For example, the electronic device 701 may determine that the first lamp 1021 is located on a left side of a TV 1011 and the second lamp 1022 is located on a right side of the TV 1011 using pre-stored information or information (e.g., information about a distance and/or direction) received from devices corresponding to the location of the user 1099. In this case, the electronic device 701 may provide a hint such as "Do you want to turn on the lamp on the left side of the TV? Or the lamp on the right side of the TV?" using the mobile device 1001. A response utterance 1090 of the user 1099 may indicate a direction such as "Right". In response to the response utterance 1090, the electronic device 701 may turn on power of the second lamp 1022.

For example, the electronic device 701 may determine that the first lamp 1021 is located on a left side of the mobile device 1001 (e.g., listener device corresponding to the location of the user 1099) and the second lamp 1022 is located on a right side of the mobile device 1001 using pre-stored information or information (e.g., information about a distance and/or direction) received from devices corresponding to the location of the user 1099. In this case, the electronic device 701 may provide a hint such as "Do you want to turn on the left lamp? Or the right lamp?" using the mobile device 1001. Since a listener device (e.g., the mobile device 1001) is assumed to be at the location of the user 1099, the hint may not include information about a device serving as a reference of location. The response utterance 1090 of the user 1099 may indicate a direction such as "Right". In response to the response utterance 1090, the electronic device 701 may turn on power of the second lamp 1022.

According to an embodiment, the electronic device 701 may identify a target device using an utterance of the user 1099 including location information. The utterance of the user 1099 may be "Turn on the right lamp". In this case, the electronic device 701 may control the mobile device 1001 (e.g., listener device) and the candidate target devices 1021 and 1022 so that the mobile device 1001 and the candidate target devices 1021 and 1022 perform positioning. The electronic device 701 may identify the first lamp 1021 being located on the left side of the mobile device 1001 and the second lamp 1022 being located on the right side of the mobile device 1001 based on positioning results received from the mobile device 1001 and the candidate target devices 1021 and 1022. The electronic device 701 may turn on power of the second lamp 1022 located on the right side of the listener device. Likewise, when the utterance of the user 1099 is "Turn on the lamp on the right side of the TV", the electronic device 701 may turn on power of the second lamp 1022 located on the right side of the TV 1011.

Figure 11:
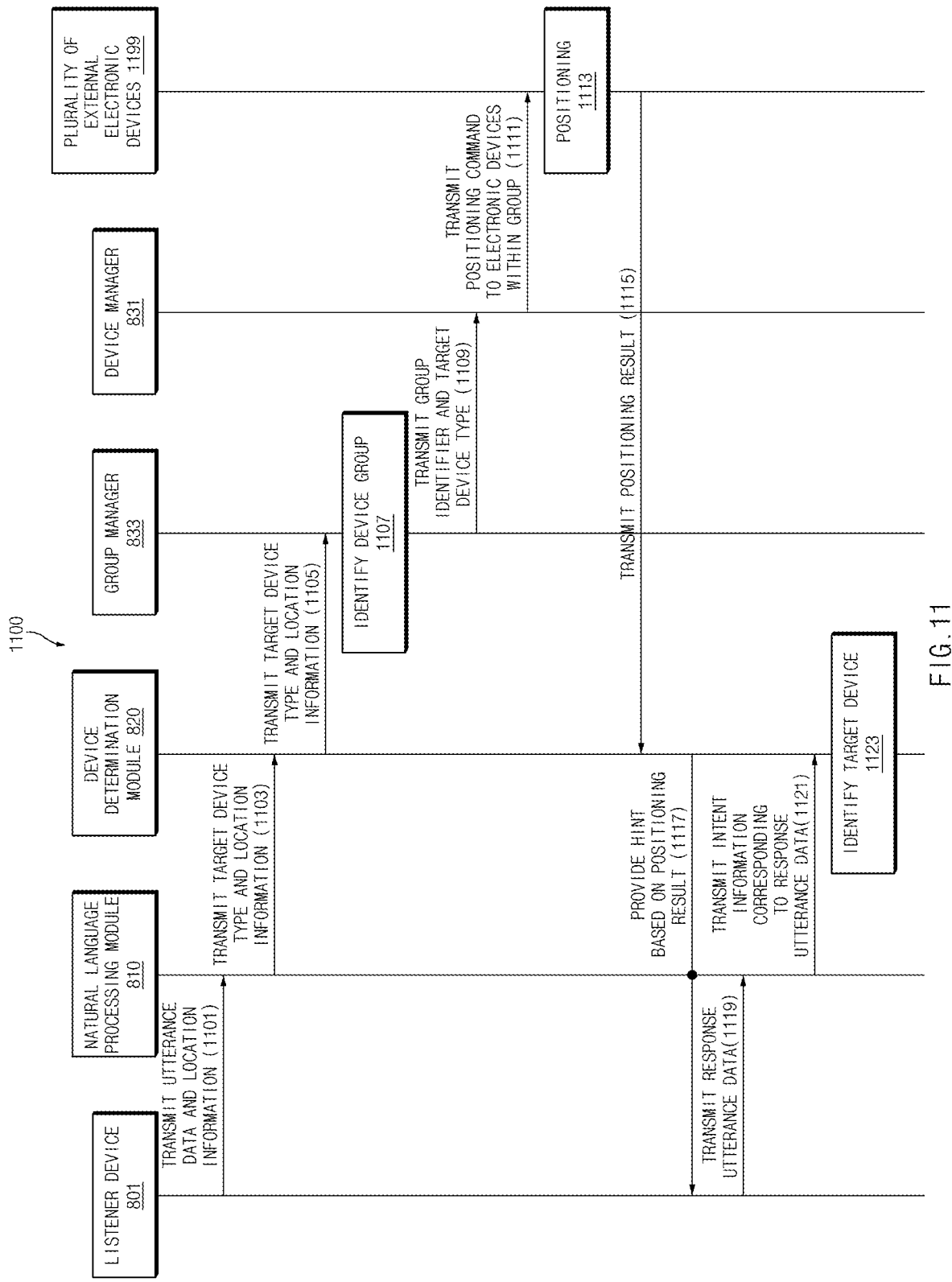
FIG. 11 is a signal flowchart illustrating an example method for identifying a target device based on a relative location according to various embodiments.

FIG. 11 is a signal flow diagram 1100 illustrating an example method for identifying a target device based on a relative location according to various embodiments.

Referring to FIGS. 8 and 11, in operation 1101, the listener device 801 may transmit utterance data and location information to the natural language processing module 810. The utterance data may include data about an utterance received from a user. The utterance data may include voice data in which a user's utterance is recorded or text data obtained by converting the utterance into text. The location information may include information (e.g., SSID) of an AP to which the listener device 801 is connected, information of an AP discovered by the listener device 801, and/or latitude and longitude information. The natural language processing module 810 may identify the type of a target device from the utterance data through automatic speech recognition and natural language understanding.

In operation 1103, the natural language processing module 810 may transmit a target device type and location information to the device determination module 820. In operation 1105, the device determination module 820 may transmit the target device type and location information to the group manager 833.

In operation 1107, the group manager 833 may identify a device group. The group manager 833, based on the received location information, may identify a group (group of a geo-fence including a location indicated by location information of the listener device 801) corresponding to the location information, and may obtain a group identifier of the identified group.

In operation 1109, the group manager 833 may transmit the group identifier and target device type to the device manager 831. In operation 1111, the device manager 831 may transmit a positioning command to electronic devices (e.g., electronic devices corresponding to the target device type identified by the utterance within a group) within a group corresponding to the group identifier. For example, the device manager 831 may transmit the positioning command via a network such as Internet.

In operation 1113, a plurality of external electronic devices 1199 may perform positioning in response to the positioning command. For example, the plurality of external electronic devices 1199 may measure a distance and/or direction based on UWB, Bluetooth, WiFi, and/or WLAN.

In operation 1115, the plurality of external electronic devices 1199 may transmit a positioning result to the device determination module 820. In operation 1117, the device determination module 820 may provide a hint based on the positioning result. For example, the device determination module 820 may identify a relative location between the plurality of external electronic devices 1199 based on the positioning result, may generate a hint including the relative location using the natural language processing module 810, and may provide the hint via the listener device 801.

In operation 1119, the listener device 801 may transmit, to the natural language processing module 810, response utterance data including a response utterance received from the user. In operation 1121, the natural language processing module 810 may transmit intent information corresponding to the response utterance data to the device determination module 820. In operation 1123, the device determination module 820 may identify a target device using the intent information corresponding to the response utterance data. As described above in relation to operation 930 of FIG. 9, the device determination module 820 may perform an operation corresponding to the utterance data using the identified target device.

Although the hint is provided in the example of FIG. 11, the user's utterance may include location information as described above with reference to FIG. 10. In this case, in operation 1103, the natural language processing module 810 may transmit, to the device determination module 820, relative location information obtained from the utterance data. The device determination module 820 may identify a target device using a positioning result (e.g., the positioning result of operation 1115) and the relative location information received from the natural language processing module 810. In this case, operations 1117, 1119, and 1121 may be skipped.

Although positioning (e.g., operation 1113) is performed after receiving utterance data in the example of FIG. 11, embodiments of the present disclosure are not limited thereto. In an embodiment, the device determination module 820 may identify a target device using pre-stored location information of the plurality of external electronic devices 1199.

Figure 12:
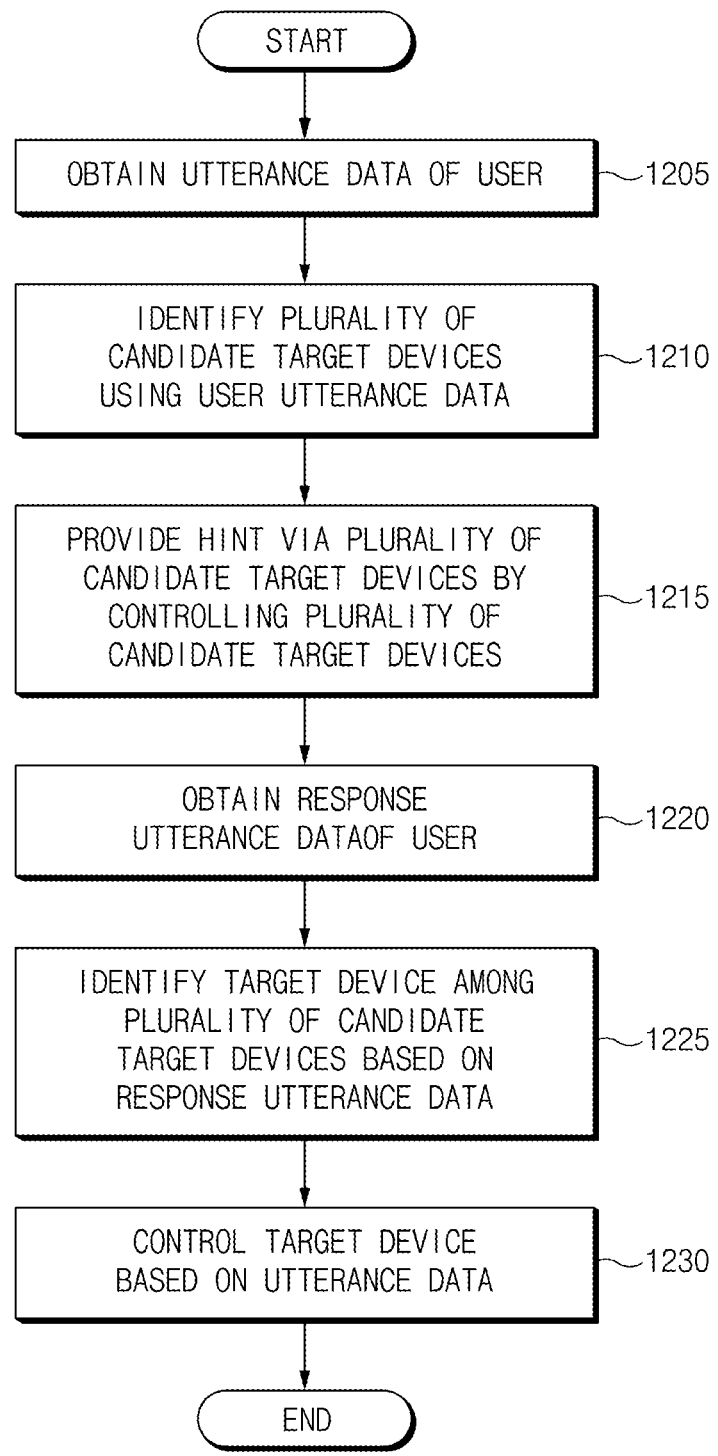
FIG. 12 is a flowchart illustrating an example method for controlling a target device via a candidate target device according to various embodiments.

FIG. 12 is a flowchart illustrating an example method for controlling a target device via a candidate target device according to various embodiments.

Referring to FIGS. 7 and 12, according to an embodiment, the electronic device 701 may identify a target device based on a response utterance of a user, and may control the identified target device.

In operation 1205, the electronic device 701 may obtain utterance data of the user. In a case in which the electronic device 701 is a listener device, the electronic device 701 may directly obtain the utterance data from the user using the audio circuitry 750. In a case in which the electronic device 701 is a server device, the electronic device 701 may obtain the utterance data from a listener device. For example, the utterance data may include an utterance about control of an external device. In the example of FIG. 12, the utterance data may be assumed to be "turn on the lamp".

In operation 1210, the electronic device 701 may identify a plurality of candidate target devices using the user utterance data. The electronic device 701 may identify an intent and/or parameter (e.g., entity) from the utterance data using the utterance data. The electronic device 701 may identify a group corresponding to a location of the user based on the location (e.g., location of a listener device) of the user. For example, the electronic device 701 may identify a group identifier of a group to which the location of the user belongs using the group DB 834 of FIG. 8. The electronic device 701 may identify external electronic devices belonging to the corresponding group using the device identifier list of the group DB 834. The electronic device 701 may obtain type information of identified external electronic devices using the device DB 832 of FIG. 8. The electronic device 701 may identify external electronic devices of the type corresponding to the utterance data as candidate target devices among the external electronic devices of the identified group. For example, the electronic device 701 may identify the candidate target devices according to the method described above in relation to operation 910 of FIG. 9.

In operation 1215, the electronic device 701 may provide a hint to the user via the plurality of candidate target devices by controlling the plurality of candidate target devices. The electronic device 701 may provide the hint to the user by controlling the plurality of candidate target devices using different methods. Namely, the electronic device 701 may control the plurality of candidate target devices in different manners so that the user may identify the candidate target devices.

For example, in the example of FIG. 12, when a plurality of lamps are identified as candidate target devices, the electronic device 701 may control the plurality of lamps using different methods. The electronic device 701 may turn on a first lamp in a first color among the plurality of lamps and turn on a second lamp in a second color that is different from the first color, and then may give the user a query such as "Lamp of which color do you want to turn on?" via a listener device.

In operation 1220, the electronic device 701 may obtain response utterance data of the user. The response utterance data may include a user's response to a provided hint. In a case in which the electronic device 701 is a server device, the electronic device 701 may obtain the response utterance data from a listener device. In a case in which the electronic device 701 is a listener device, the electronic device 701 may obtain the response utterance data using a microphone of the electronic device 701.

In operation 1225, the electronic device 701 may identify a target device among the plurality of candidate target devices based on the response utterance data. The electronic device 701 may identify a user's intent and/or additional information (e.g., entity) included in the response utterance data through automatic speech recognition and natural language understanding on the response utterance data. The electronic device 701 may identify which of the candidate target devices corresponds to a target device by comparing the hint provided to the user and the intent and/or additional information of the response utterance data. For example, the response utterance data may include information about the hint provided via the candidate target devices. The electronic device 701 may identify, as a target device, a device indicated by the response utterance data or the hint and response utterance data.

For example, when lamps are controlled to have different colors, the response utterance may be "Turn on the lamp of the first color". In this case, the electronic device 701 may identify, as a target device, a candidate target device controlled to have the first color.

In operation 1230, the electronic device 701 may control a target device based on the utterance data. The electronic device 701 may perform an operation corresponding to the intent of the utterance data obtained in operation 1205 using the identified target device. For example, the electronic device 701 may transmit a signal for performing an operation indicated by the utterance data to the identified target device directly or via another device.

In the example of FIG. 12, the response utterance data may be referred to as response data of the user. The response data may include a response through a user utterance or a user input (e.g., input through a display of a listener device).

Figure 13:
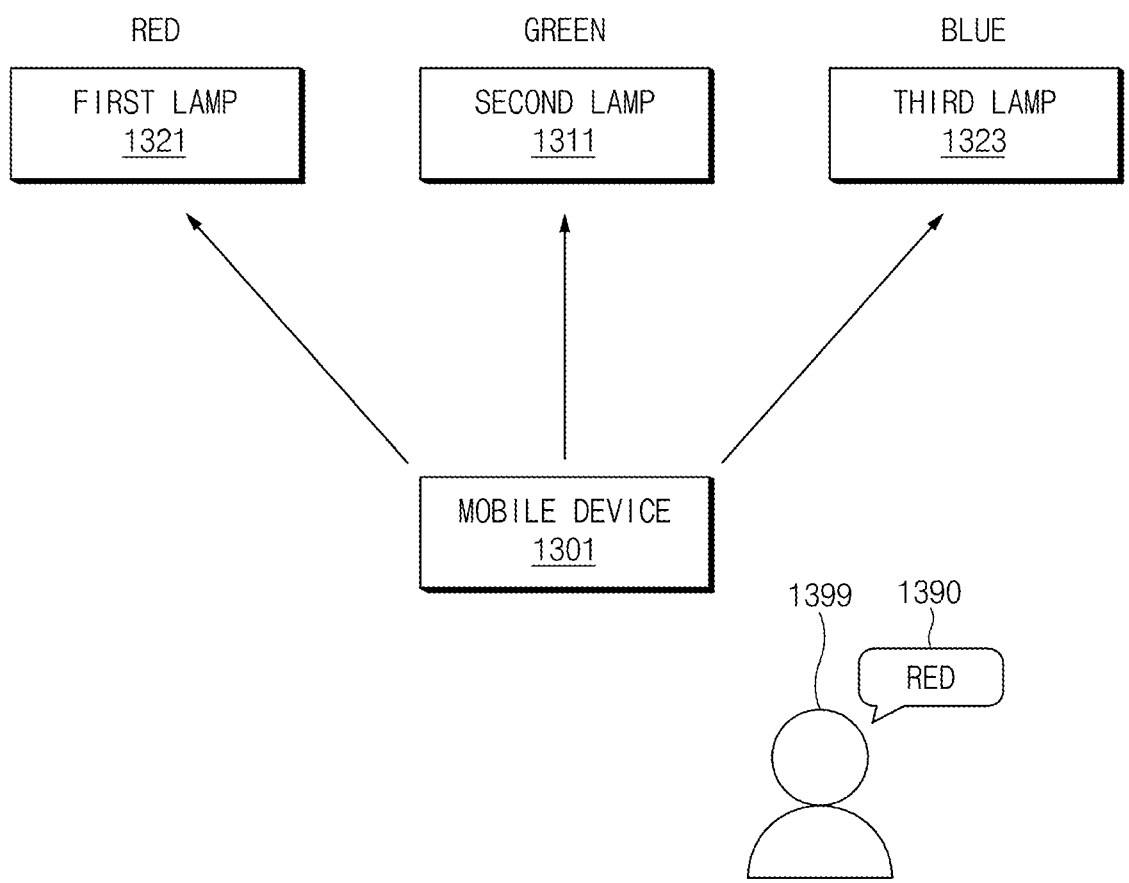
FIG. 13 illustrates an example method for identifying a target device via a candidate target device according to various embodiments.

FIG. 13 illustrates an example method for identifying a target device via a candidate target device according to various embodiments.

Referring to FIGS. 7 and 13, according to an embodiment, the electronic device 701 may provide a hint via a candidate target device in response to an utterance of a user 1399 who does not specify a particular target device.

For example, the user 1399 may give an utterance for controlling an external device using a mobile device 1301 as a listener device. For example, the utterance may be "Turn on the lamp". The electronic device 701, based on the utterance, may identify a first lamp 1321, a second lamp 1311, and a third lamp 1323, which correspond (e.g., belong to a group corresponding to a location of the user 1399) to a location (e.g., location of the mobile device 1301) of the user 1399 and correspond to the type "lamp" of a control device of the utterance. The electronic device 701 may identify the first lamp 1321, the second lamp 1311, and the third lamp 1323 as candidate target devices corresponding to the utterance.

For example, the electronic device 701 may control the first lamp 1321, the second lamp 1311, and the third lamp 1323 using different methods. The electronic device 701 may turn on the first lamp 1321 in a red color, the second lamp 1311 in a green color, and the third lamp 1323 in a blue color. After differently controlling the candidate target devices, the electronic device 701 may give the user a query such as "Lamp of which color do you want to turn on?" via a listener device (e.g., mobile device 1301). Here, the query may include information indicating a different control method. When the different control method is varying color, the query may include information indicating "color".

A response utterance 1390 of the user 1399 may include information corresponding to one of different control methods, such as "RED". In response to the response utterance 1390, the electronic device 701 may turn on power of the first lamp 1321.

Figure 14:
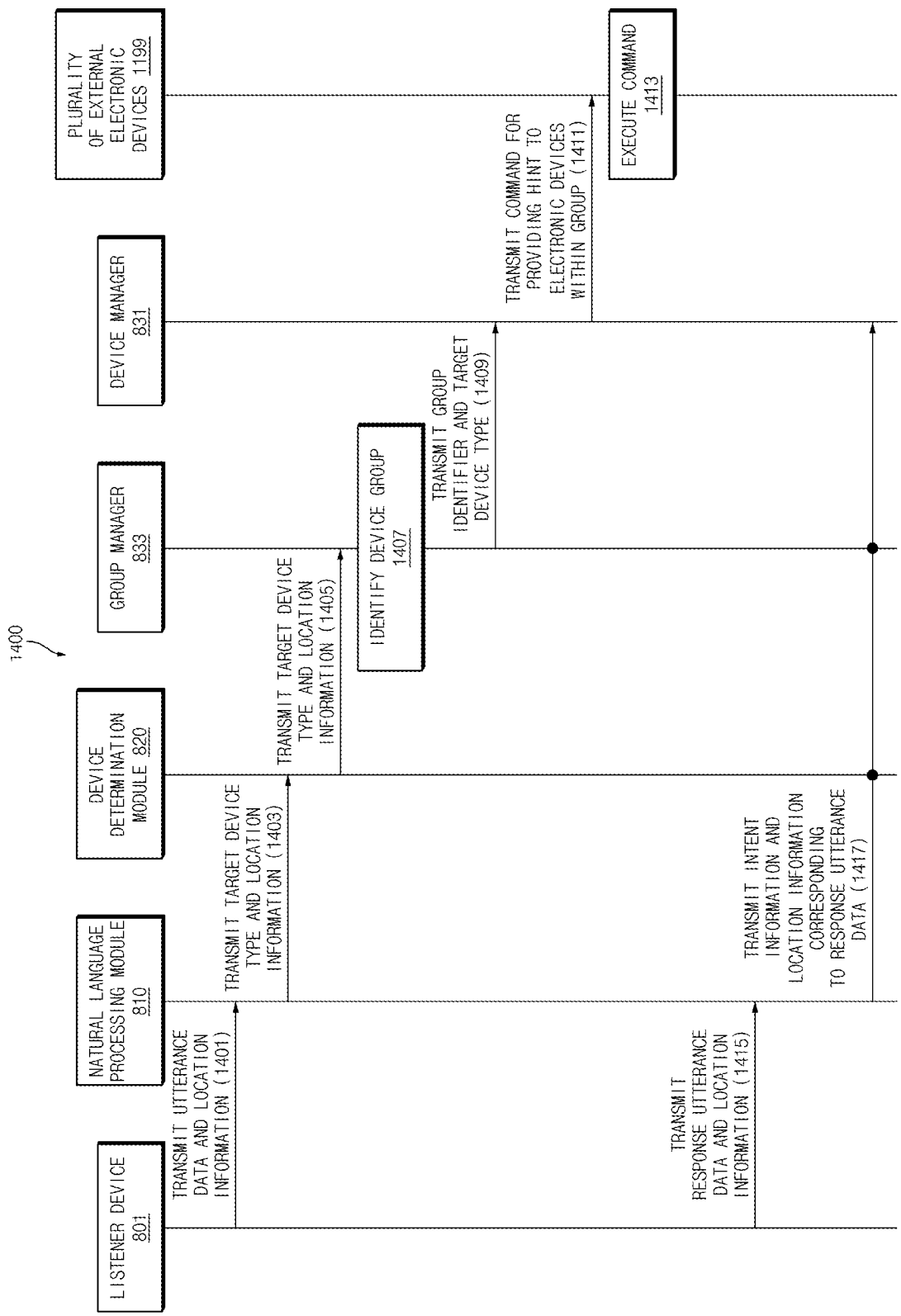
FIG. 14 is a signal flowchart illustrating an example method for identifying a target device via a candidate target device according to various embodiments.

FIG. 14 is a signal flow diagram 1400 illustrating an example method for identifying a target device via a candidate target device according to various embodiments.

Referring to FIGS. 8 and 14, in operation 1401, the listener device 801 may transmit utterance data and location information to the natural language processing module 810. The utterance data may include data about an utterance received from a user. The utterance data may include voice data in which a user's utterance is recorded or text data obtained by converting the utterance into text. The location information may include information (e.g., SSID) of an AP to which the listener device 801 is connected, information of an AP discovered by the listener device 801, and/or latitude and longitude information. The natural language processing module 810 may identify the type of a target device from the utterance data through automatic speech recognition and natural language understanding.

In operation 1403, the natural language processing module 810 may transmit a target device type and location information to the device determination module 820. In operation 1405, the device determination module 820 may transmit the target device type and location information to the group manager 833.

In operation 1407, the group manager 833 may identify a device group. The group manager 833, based on the received location information, may identify a group (group of a geo-fence including a location indicated by location information of the listener device 801) corresponding to the location information, and may obtain a group identifier of the identified group.

In operation 1409, the group manager 833 may transmit the group identifier and target device type to the device manager 831. In operation 1411, the device manager 831 may transmit a command for providing a hint to electronic devices (e.g., electronic devices corresponding to the target device type identified by the utterance within a group) within a group corresponding to the group identifier. For example, control commands that indicate different control methods may be respectively transferred to the plurality of external electronic devices 1199. For example, the device manager 831 may transmit the control command via a network such as Internet.

In operation 1413, the plurality of external electronic devices 1199 may execute a command according to the received command. Since the plurality of external electronic devices 1199 have received different commands, the plurality of external electronic devices 1199 may perform different operations.

In operation 1415, the listener device 801 may transmit, to the natural language processing module 810, response utterance data received from the user. In operation 1417, the natural language processing module 810 may transmit intent information and location information corresponding to the response utterance data to the device manager 833 via the device determination module 820. The device manager 831, based on the intent information corresponding to the response utterance data, may transfer information of a target device (device corresponding to the intent information among devices of the group corresponding to the location information) corresponding to the intent information to the device determination module 820, and the device determination module 820 may identify the target device using the received information of the target device. The device determination module 820 may transmit a command corresponding to the intent of the utterance data of operation 1401 to the identified target device so as to perform an operation corresponding to the intent.

Figure 15:
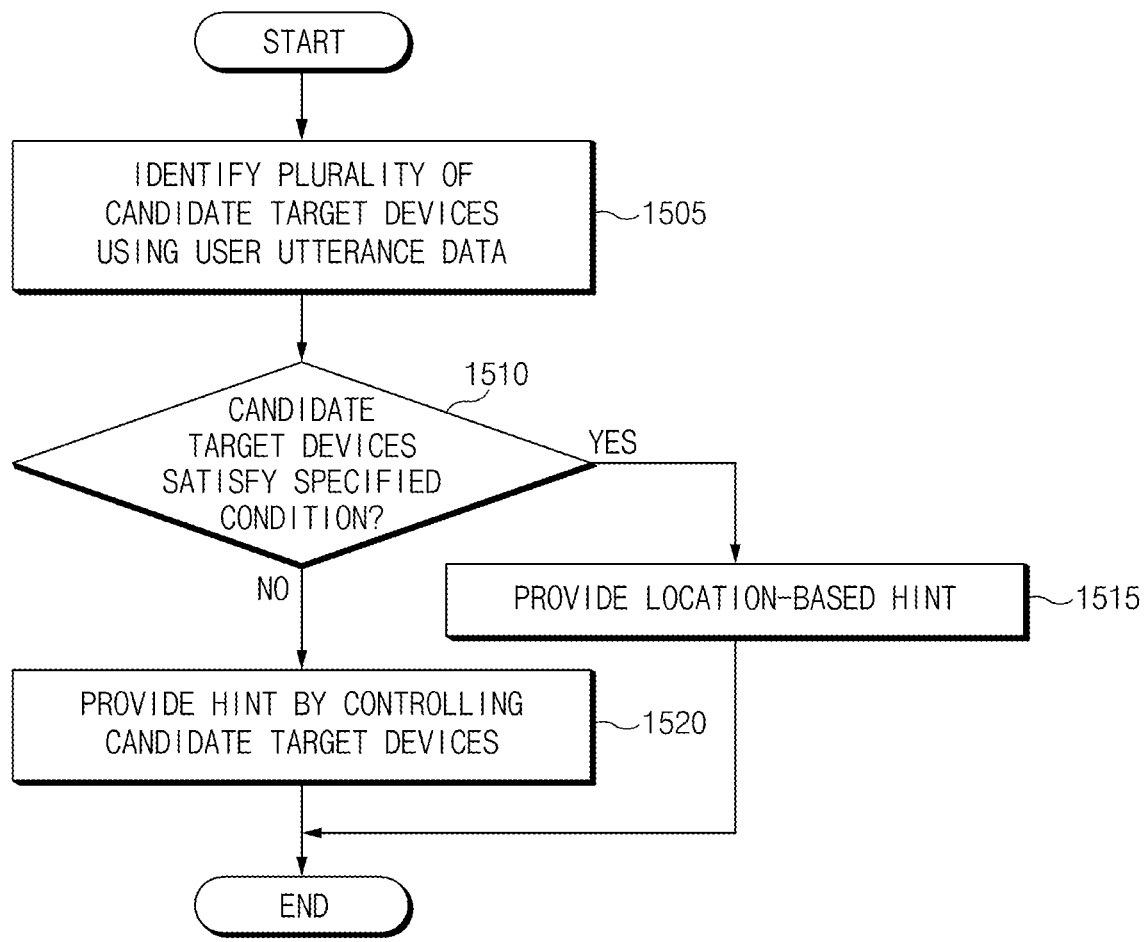
FIG. 15 is a flowchart illustrating an example hint providing method according to various embodiments.

FIG. 15 is a flowchart illustrating an example hint providing method according to various embodiments.

Referring to FIGS. 7 and 15, according to an embodiment, the electronic device 701 may be configured to perform an operation by combining the location-based hint provision described above with reference to FIGS. 9, 10, and 11 and the hint provision through a candidate target device described above with reference to FIGS. 12, 13, and 14.

In operation 1505, the electronic device 701 may identify a plurality of candidate target devices using user utterance data. For example, the electronic device 701 may identify the plurality of candidate target devices according to operation 910 of FIG. 9 or operation 1210 of FIG. 12.

In operation 1510, the electronic device 701 may determine whether the candidate target devices satisfy a specified condition. The specified condition may include, for example, the number of the candidate target devices and/or capability of the candidate target devices. When the number of the candidate target devices is equal to or less than a specified number (e.g., 2), the electronic device 701 may determine that the candidate target devices satisfy the specified condition. This is because it may be difficult to provide a location-based hint when the number of the candidate target devices is large. When the capability of the candidate target devices includes a positioning capability, the electronic device 701 may determine that the candidate target devices satisfy the specified condition. This is because it may be difficult to perform positioning between the candidate target devices when the candidate target devices do not have the positioning capability. When the number of the candidate target devices is equal to or less than the specified number and the candidate target devices have the positioning capability, it may be determined that the candidate target devices satisfy the specified condition.

When the specified condition is satisfied (e.g., operation 1510—YES), the electronic device 701 may provide a location-based hint in operation 1515. For example, the electronic device 701 may provide the hint according to the methods described above with reference to FIGS. 9, 10, and 11.

When the specified condition is not satisfied (e.g., operation 1510-NO), the electronic device 701 may provide the hint by controlling the candidate target devices in operation 1520. For example, the electronic device 701 may provide the hint according to the methods described above with reference to FIGS. 12, 13, and 14.

Figure 16:
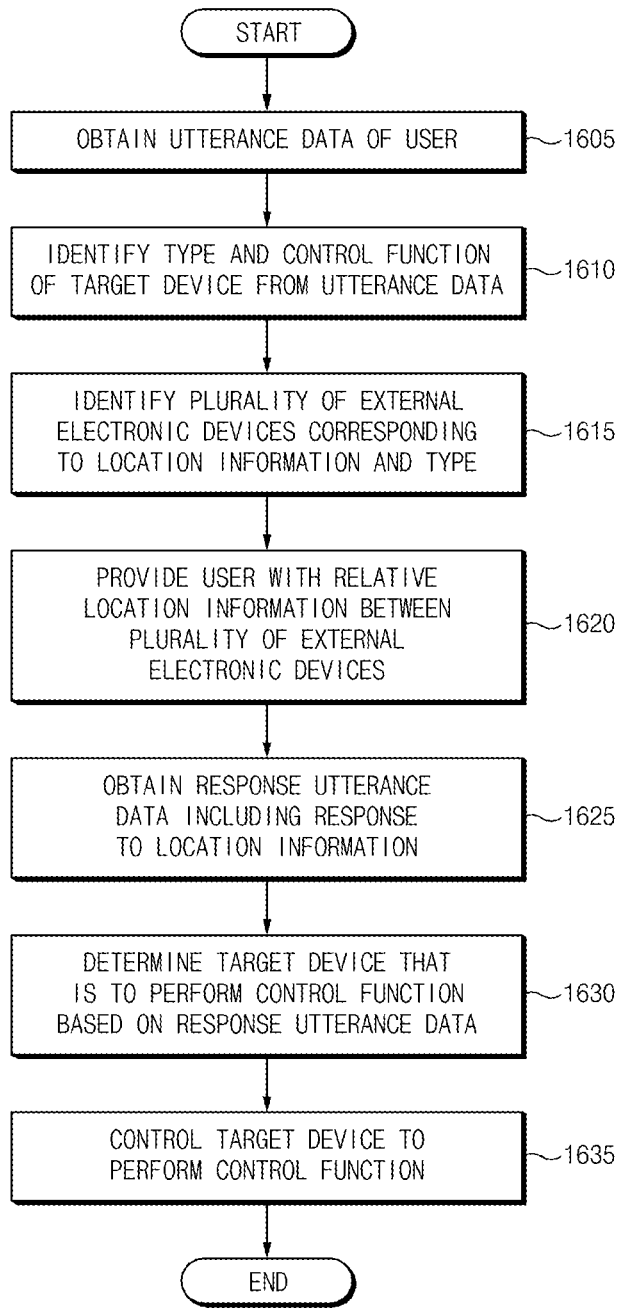
FIG. 16 is a flowchart illustrating an example method for controlling a target device according to various embodiments.

FIG. 16 is a flowchart illustrating an example method for controlling a target device according to various embodiments.

Referring to FIGS. 7 and 16, according to an embodiment, a method for the electronic device 701 to control a target device may include: obtaining utterance data and location information of a user (e.g., operation 1605); identifying a type and control function of a target device from the utterance data (e.g., operation 1610); identifying a plurality of external electronic devices corresponding to the location information and the type (e.g., operation 1615); providing the user with relative location information between the plurality of external electronic devices based on identification of the plurality of external electronic devices (e.g., operation 1620); obtaining, from the user, response utterance data including a response to the relative location information (e.g., operation 1625); determining a target device that is to perform the control function among the plurality of external electronic devices based on the response utterance data (e.g., operation 1630); and controlling the target device so that the target device performs the control function (e.g., operation 1635).

In operation 1605, the electronic device 701 may obtain user utterance data. For example, the electronic device 701 may obtain the utterance data according to the method described above in relation to operation 905 of FIG. 9.

In operation 1610, the electronic device 701 may identify the type and control function of a target device from the utterance data. For example, the electronic device 701 may identify the control function based on an intent obtained from the utterance data. The electronic device 701 may identify the type of a target device based on additional information (e.g., entity) obtained from the utterance data. The above descriptions provided with reference to FIG. 8 may be referenced with regard to a method for obtaining the intent and additional information from the utterance data.

In operation 1615, the electronic device 701 may identify a plurality of external electronic devices corresponding to the location information and type. For example, the electronic device 701 may identify the plurality of external electronic devices according to the method for identifying candidate target devices, described above in relation to operation 910 of FIG. 9. The identified external electronic devices may include an external electronic device corresponding to the type among external devices associated with the user and belonging to a geographic region corresponding to the location information.

In operation 1620, the electronic device 701 may provide the user with the relative location information between the plurality of external electronic devices. The relative location information may correspond to the hint described above in relation to operation 915 of FIG. 9. Information about the relative location information may be referred to as information for distinguishing a target device to be controlled by the user. For example, the relative location information may include information for differentiating the plurality of external electronic devices based on a relative location. The electronic device 701 may provide the relative location information according to the hint providing method described above in relation to operation 915 of FIG. 9.

In an embodiment, the electronic device 701 may transmit a command for performing positioning to the plurality of external electronic devices, receive positioning information from the plurality of external electronic devices based on the command, and obtain the relative location information based on the positioning information.

In operation 1625, the electronic device 701 may obtain response utterance data including a response to the location information. For example, the electronic device 701 may obtain the response utterance data according to the method described above in relation to operation 920 of FIG. 9.

In operation 1630, the electronic device 701 may determine a target device that is to perform a control function based on the response utterance data. For example, the electronic device 701 may determine a target device according to the method described above in relation to operation 925 of FIG. 9.

For example, the relative location information may include a location of a second external electronic device relative to a third external electronic device and a location of a first external electronic device relative to the third external electronic device. The first, second, and third external electronic devices may correspond to the location information. The first and third external electronic devices may correspond to the type, but the second external electronic device may not correspond to the type. For example, the response utterance data may include information indicating the location of the second external electronic device relative to the third external electronic device or the location of the first external electronic device relative to the third external electronic device. The electronic device 701 may determine one of the first external electronic device and the third external electronic device as a target device using the relative location indicated by the response utterance data.

In operation 1635, the electronic device 701 may control the target device to perform the control function. The electronic device 701 may control the target device according to the method described above in relation to operation 930 of FIG. 9.

Figure 17:
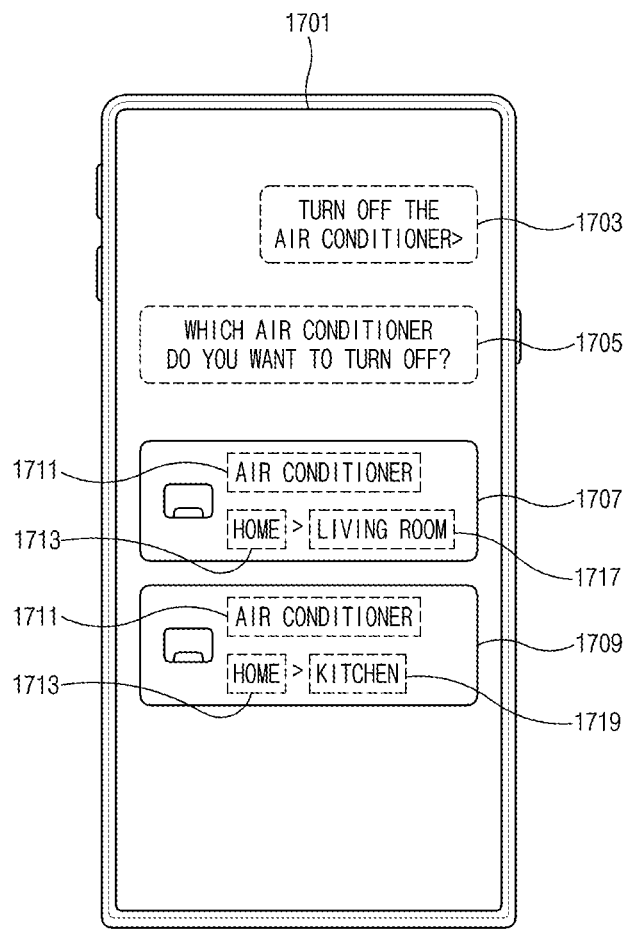
FIG. 17 illustrates an example user interface according to various embodiments.

FIG. 17 illustrates an example user interface according to various embodiments.

Referring to FIG. 17, a user interface 1701 may be provided to a user via a listener device (e.g., the listener device 801 of FIG. 8).

The user interface 1701 may include text information "Turn off the air conditioner" that is utterance information 1703 corresponding to a user utterance. In the example of FIG. 17, it may be assumed that the listener device is located in a home of the user, and two air conditioners are located in the home.

The user interface 1701 may include query information that asks about which of the two air conditioners in the home is referred to. For example, the query information may include a query 1705 and information 1707 and 1709 indicating locations of candidate target devices (air conditioners).

First location information 1707 may include type information 1711, group information 1713, and location information 1717 corresponding to the utterance information 1703. Second location information 1709 may include type information 1711, group information 1713, and location information 1719 corresponding to the utterance information 1703. In the present example, candidate target devices of the same type may be differentiated by the location information 1717 and 1719. The user may be enabled to more easily differentiate candidate target devices by providing location information instead of a model name or a name that is not familiar to the user.

In relation to FIG. 17, although a visual hint is provided through a display, a person skilled in the art could easily understand that an audio hint may also be provided as described above.

Referring back to FIGS. 6 and 7, examples of providing a hint according to the above-described various methods will be described.

For example, the user 699 may speak "Turn off the light". In this case, entire light may be turned off, but if it is determined that the user 699 intends to turn off partial light, the electronic device 701 may provide the user 699 with information (e.g., hint) that asks about which light should be turned off. Based on a response to the hint, the electronic device 701 may determine a target device to be controlled.

For example, the electronic device 701 may provide the user 699 with a query including information about locations relative to other devices, such as "Do you want to turn off the light next to the TV? Or the light next to the refrigerator?"

For example, when the user 699 is wearing augmented reality (AR) glasses, the electronic device 701 may provide additional information (e.g., hint) about candidate target devices to the user 699 via the AR glasses. For example, the electronic device 701 may identify a target device based on a response utterance of the user 699 for the additional information.

The query may be visually and/or acoustically provided to the user 699 via a listener device (e.g., mobile phone 602).

Figure 18:
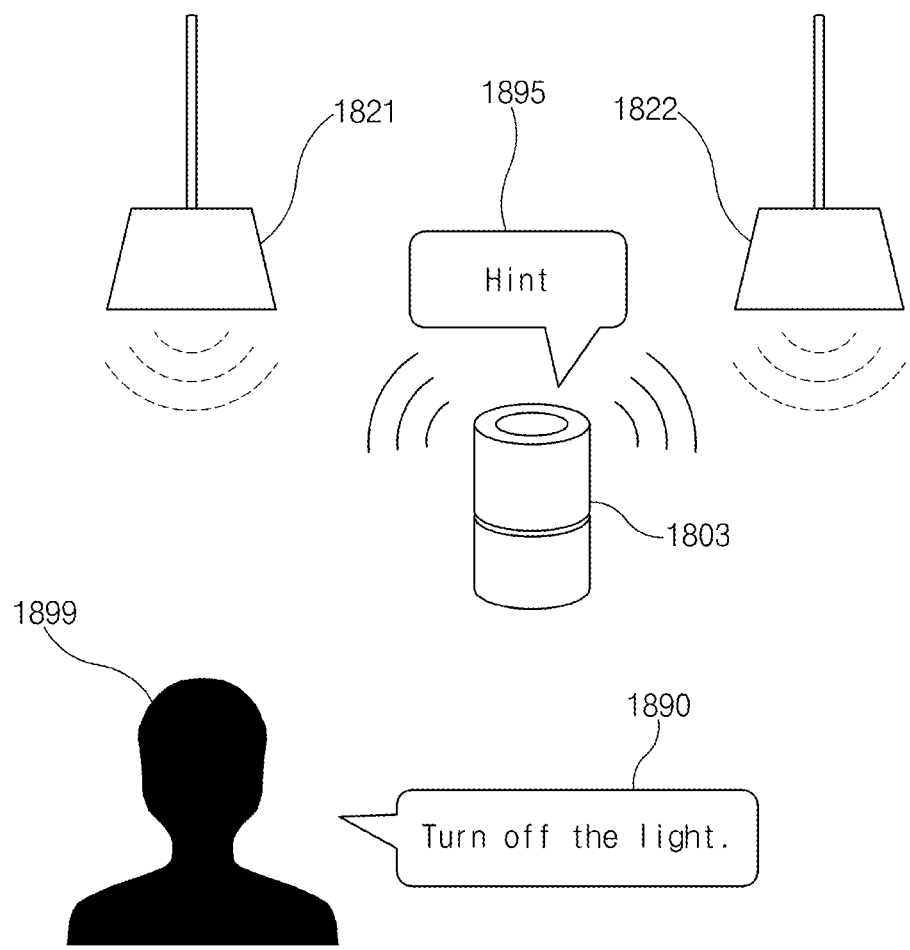
FIG. 18 illustrates an example hint provision according to various embodiments.

FIG. 18 illustrates example hint provision according to various embodiments.

Referring to FIGS. 7 and 18, for example, a listener device may be a speaker 1803. In the example of FIG. 18, it may be assumed that the speaker 1803 receives an utterance from a user 1899. In an example, the speaker 1803 may be a listener device, and the electronic device 701 may be a server device. In another example, the speaker 1803 may be both a listener device and the electronic device 701.

The speaker 1803 may identify a location of the user 1899. For example, the speaker 1803 may receive an utterance 1890 of the user 1899 using multiple microphones and analyze the utterance 1890 received using each of the multiple microphones so as to identify the location of the user 1899.

For another example, the speaker 1803 may identify the location of the user 1899 by identifying a location (e.g., based on UWB, angle of arrival, etc.) of a user device (not shown) of the user 1899. For another example, the speaker 1803 may identify the location of the user 1899 by obtaining a surroundings image and identifying an image corresponding to the user 1899 from the surroundings image.

According to an embodiment, the electronic device 701 may be configured to generate a hint 1895 based on a relative location of candidate target devices to be controlled by the utterance 1890. For example, when the utterance 1890 of the user 1899 is "Turn off the light", the electronic device 701 may generate a query (e.g., hint 1895) based on the location of the user 1899. For example, the electronic device 701 may generate the query using the location of the user 1899 relative to the speaker 1803 and locations of lamps (e.g., first light 1821, second light 1822) relative to the speaker 1803. The electronic device 701 may generate the query so that the query includes a relative location based on the user 1899. For example, the hint 1895 may include direction information based on the user 1899, such as "Do you want to turn off the left light or the right light". The electronic device 701 may identify (e.g., operation 1225 of FIG. 12) a target device based on a response utterance of the user 1899.

Figure 19:
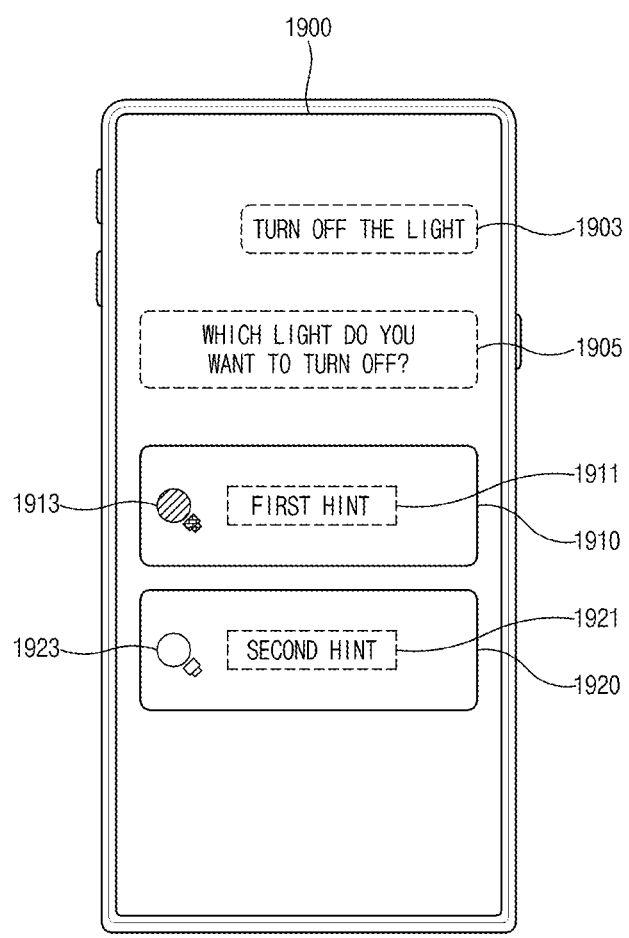
FIG. 19 illustrates an example user interface according to various embodiments.

FIG. 19 illustrates an example user interface according to various embodiments.

Referring to FIGS. 7 and 19, a user interface 1900 may be provided to a user via a listener device (e.g., the listener device 801 of FIG. 8).

The user interface 1900 may include text information "Turn off the light" that is utterance information 1903 corresponding to a user utterance. In the example of FIG. 19, it may be assumed that the listener device is located in a home of the user, and two lights are located in the home.

According to an embodiment, the electronic device 701 may provide a hint for a candidate target device by temporarily controlling the candidate target device. For example, in response to the utterance "Turn off the light" of the user, the electronic device 701 may identify a first lamp and a second lamp that are candidate target devices, and may turn on the first lamp in a red color and the second lamp in a blue color. The electronic device 701 may provide the user with a hint together with a query 1905 such as "Which light do you want to turn off?" The electronic device 701 may allow the user to identify a target device by providing a hint through the user interface 1900.

For example, it may be assumed that the electronic device 701 turns on the first lamp in a red color and the second lamp in a blue color. First information 1910 may include an icon 1913 indicating a state (e.g., color) of the first light and/or a first hint 1911 describing the state of the first light. For example, the first hint 1911 may include a query such as "Do you want to turn off the red light?" Second information 1920 may include an icon 1923 indicating a state of the second light and/or a second hint 1921 describing the state of the second light. For example, the second hint 1921 may include a query such as "Do you want to turn off the blue light?" The electronic device 701 may identify (e.g., operation 1225 of FIG. 12) a target device based on a user's response utterance or touch input (e.g., touch input to the first information 1910 or the second information 1920).

For example, the electronic device 701 may provide a hint to the user not only by differently controlling color but also by varying brightness, flicker, and/or an order in which lights are turned on. The electronic device 701 may provide a hint by controlling the first light and the second light so that a brightness of the first light is lower than that of the second light. In this case, the first hint 1911 may include a query such as "Do you want to turn off the dark light?" Furthermore, the icon 1913 may be displayed darker than the icon 1923 of the second light. The second hint 1921 may include a query such as "Do you want to turn off the bright light?"

Although hint provision based on control of a candidate target device has been described with reference to FIG. 19, embodiments of the present disclosure are not limited thereto. For example, the electronic device 701 may be configured to provide a hint based on information (e.g., information about the type, model name, or commonly used name of candidate target devices) of candidate target devices. In the example of FIG. 19, the first light may be a floor stand, and the second light may be a chandelier. In this case, the first hint 1911 may include information of the first light. For example, the first hint 1911 may be "Do you want to turn off the floor stand?" The second hint 1921 may include information of the second light. For example, the second hint 1921 may be "Do you want to turn off the chandelier?"

Figure 20:
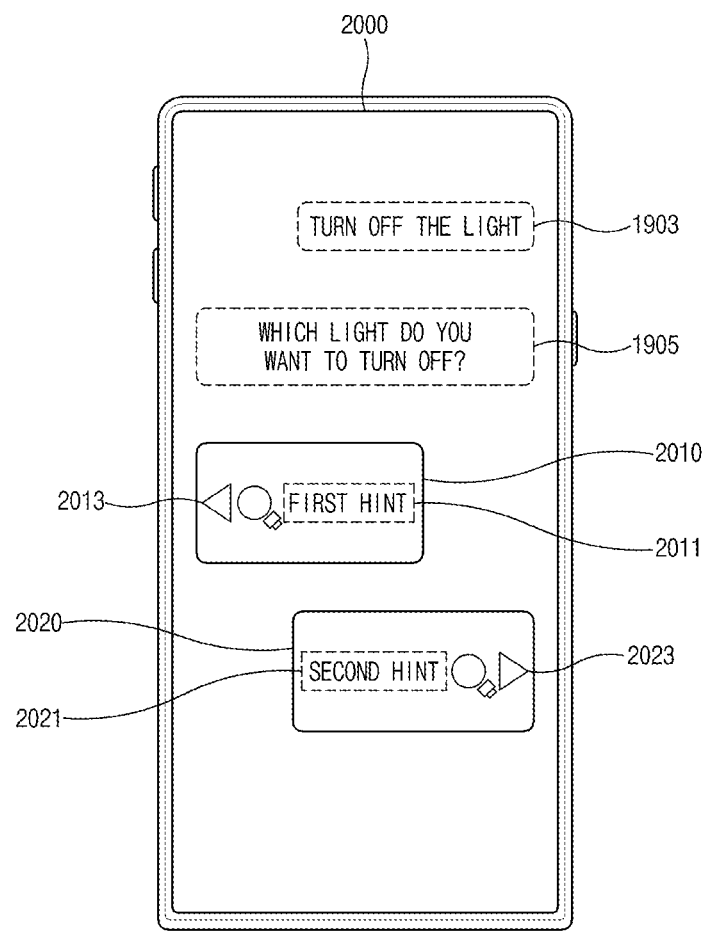
FIG. 20 illustrates an example user interface according to various embodiments.

FIG. 20 illustrates an example user interface according to various embodiments.

Referring to FIGS. 7 and 20, a user interface 2000 may be provided to a user via a listener device (e.g., the listener device 801 of FIG. 8).

The user interface 2000 may include text information "Turn off the light" that is utterance information 1903 corresponding to a user utterance. In the example of FIG. 20, it may be assumed that the listener device is located in a home of the user, and two lights are located in the home. Although a hint is provided via the speaker 1803 in the example of FIG. 18, the hint may be provided to the user via a user device of the user as described below. In the example of FIG. 20, the electronic device 701 may identify relative locations of candidate target devices based on the location of the user. For example, as in the example of FIG. 18, it may be assumed that lights are located on the left side and right side of the user.

For example, in response to the utterance "Turn off the light" of the user, the electronic device 701 may identify a first lamp and a second lamp that are candidate target devices. The electronic device 701 may provide a hint to the user based on relative locations of the candidate target devices. The electronic device 701 may allow the user to identify a target device by providing a hint through the user interface 2000.

The electronic device 701 may provide the user with a hint together with a query 1905 such as "Which light do you want to turn off?" The electronic device 701 may allow the user to identify a target device by providing a hint through the user interface 2000.

For example, the user interface 2000 may include first information 2010 including a first hint 2011 for a first light (e.g., the first light 1821 of FIG. 18) and second information 2020 including a second hint 2021 for a second light (e.g., the second light 1822 of FIG. 18).

The first information 2010 and the second information 2020 may include relative location of the corresponding first light and second light. For example, the first information 2010 may include a first indicator 2013 indicating the relative location of the first light, and the second information 2020 may include a second indicator 2023 indicating the relative location of the second light. For example, the first information 2010 may include the first hint 2011 (e.g., left light) indicating the location of the first light. The second information 2020 may include the second hint 2021 (e.g., right light) indicating the location of the second light. For example, since the first information 2010 is displayed on a left side compared to the second information 2020, it may be shown that the first light is located on a left side compared to the second light.

The electronic device 701 may identify (e.g., operation 1225 of FIG. 12) a target device based on a user's response utterance or touch input (e.g., touch input to the first information 2010 or the second information 2020).

Figure 21:
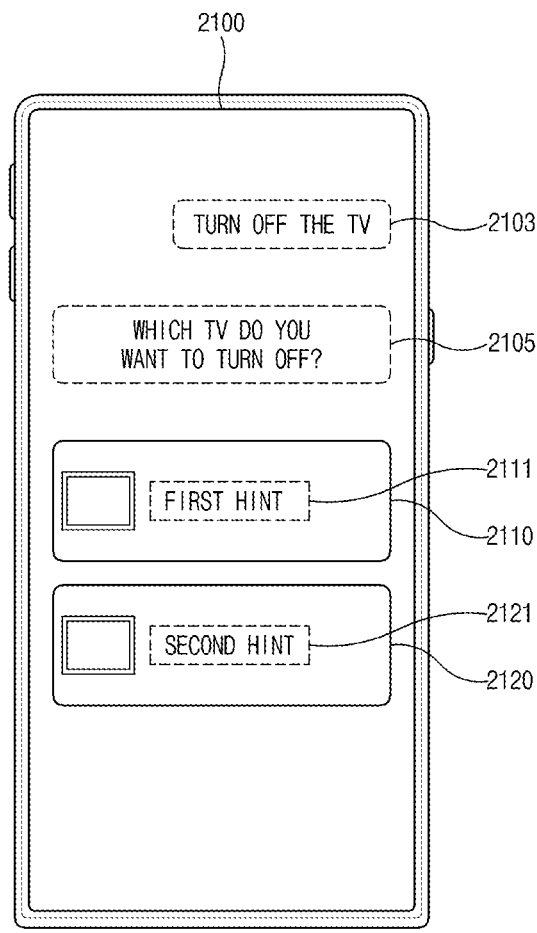
FIG. 21 illustrates an example user interface according to various embodiments.

FIG. 21 illustrates an example user interface according to various embodiments.

Although different control methods using lamps are described in various embodiments of the present disclosure, embodiments of the present disclosure are not limited thereto. For example, when a hint is provided via a TV, the hint may be provided to a user by differently setting a volume or channel of a TV.

Referring to FIGS. 7 and 21, a user interface 2100 may be provided to a user via a listener device (e.g., the listener device 801 of FIG. 8).

The user interface 2100 may include text information "Turn off the TV" that is utterance information 2103 corresponding to a user utterance. In the example of FIG. 21, it may be assumed that the listener device is located in a home of the user, and two TVs are located in the home. In the example of FIG. 21, the electronic device 701 may identify candidate target devices based on the location of the user. For example, a first TV and a second TV may be identified as candidate target devices.

The electronic device 701 may provide the user with a hint together with a query 2105 such as "Which TV do you want to turn off?" The electronic device 701 may allow the user to identify a target device by providing a hint through the user interface 2100. For example, the user interface 2100 may include first information 2110 and second information 2120 showing information for identifying a candidate target device.

For example, the electronic device 701 may provide a hint based on information (e.g., color, model name, and/or name) of a candidate target device. In an example, a first hint 2111 and a second hint 2121 may include model names of the first TV and the second TV, respectively. The model name of the first TV may be D7000, and the model name of the second TV may be SERO. In this case, the first hint 2111 may include a query such as "Do you want to turn off the D7000 TV?", and the second hint 2121 may include a query such as "Do you want to turn off the SERO TV?" In an example, the first hint 2111 and the second hint 2121 may include colors of the first TV and the second TV, respectively. In this case, the first hint 2111 may include information indicating the color of the first TV, and the second hint 2121 may include information indicating the color of the second TV.

For example, the electronic device 701 may provide a hint based on a current state (e.g., current channel, music) of a candidate target device. In the present example, the first TV may be playing news, and the second TV may be playing music. In this case, the first hint 2111 may include a query such as "Do you want to turn off the TV on which you are watching the news?", and the second hint 2121 may include a query such as "Do you want to turn off the TV playing music?"

The electronic device 701 may identify (e.g., operation 1225 of FIG. 12) a target device based on a user's response utterance or touch input (e.g., touch input to the first information 2110 or the second information 2120).

The above-described different control methods are illustrative, and a person skilled in the art could understand that any control method which allows the user to differentiate devices of the same type through the devices may be used to provide a hint. For example, the electronic device 701 may use a control method such as that described below with reference to FIG. 22 in order to provide a hint.

Figure 22:
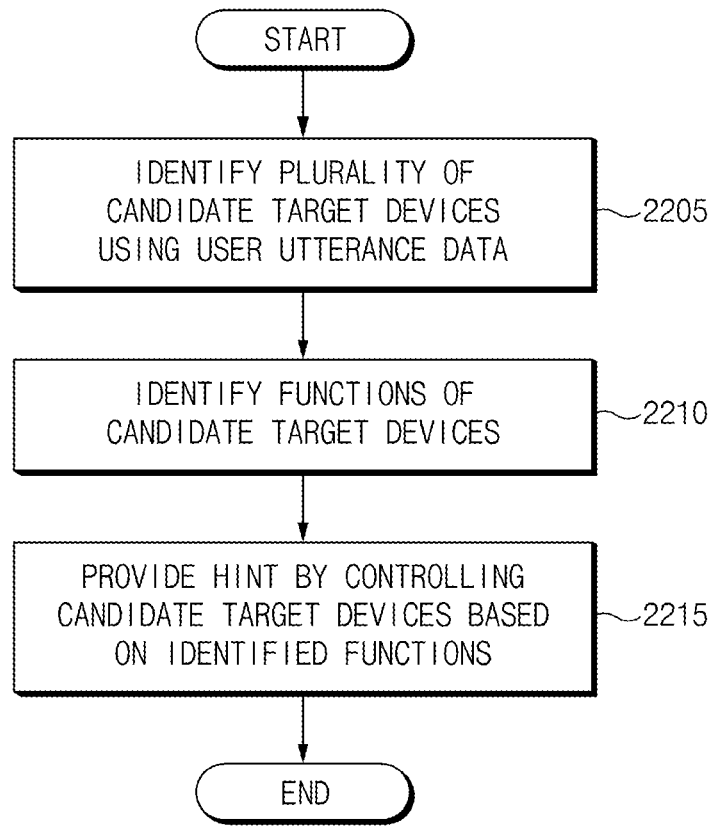
FIG. 22 is a flowchart illustrating an example hint providing method according to various embodiments.

FIG. 22 is a flowchart illustrating an example hint providing method according to various embodiments.

Referring to FIGS. 7 and 22, according to an embodiment, the electronic device 701 may be configured to provide a hint based on functions of candidate target devices.

In operation 2205, the electronic device 701 may identify a plurality of candidate target devices using the user utterance data. For example, the electronic device 701 may identify the plurality of candidate target devices according to operation 910 of FIG. 9 or operation 1210 of FIG. 12.

In operation 2210, the electronic device 701 may identify functions of the candidate target devices. For example, the electronic device 701 may store a database including information about functions (e.g., function controllable by the electronic device 701) supportable by the candidate target devices, and may identify the functions of the target devices using the database. For another example, the electronic device 701 may identify the functions of the target devices by receiving information from an external database (e.g., the device DB 832 of FIG. 8) including information about functions supportable by the candidate target devices.

In operation 2215, the electronic device 701 may provide a hint by controlling the candidate target devices based on the identified functions. According to an embodiment, the electronic device 701 may provide the hint by determining a function to be used for providing the hint among the identified functions and controlling the determined function.

According to an embodiment, the electronic device 701 may identify a common function of the candidate target devices and determine the common function as a function to be used for providing the hint. The electronic device 701 may provide the hint by controlling the common function (e.g., controlling a level of the common function). The "common function" is a function of a common type among functions of the candidate target devices, and may be referred to as a function that may provide a hint through discriminative control. For example, the functions of the candidate target devices may include a function name for each of the functions, and the electronic device 701 may include a database which stores information that categorizes each function name. In this case, the electronic device 701 may identify a function belonging to the same category as the common function. The electronic device 701 may identify the common function using information (e.g., function information) obtained from a database (e.g., database inside or outside the electronic device 701) including information about the functions of the candidate target devices. The electronic device 701 may provide the hint by controlling the common function in different manners or to different levels in each of the candidate target devices.

For example, in a case in which the candidate target devices are lamps, the electronic device 701 may identify the common function for differentiating the candidate target devices. If a first candidate target device is adjustable in color and brightness and a second candidate target device is adjustable only in brightness, the electronic device 701 may identify brightness adjustment as the common function. In this case, the electronic device 701 may provide the hint by adjusting the brightness of the first candidate target device and the second candidate target device. The electronic device 701 may provide the hint by controlling the common function of candidate target devices of different types. For example, a user's utterance may be "Turn down the volume". In this case, the electronic device 701 may identify a plurality of candidate target devices (e.g., TV and speaker) having a volume adjustment function. In response to the user's utterance "Turn down the volume", the electronic device 701 may identify a speaker and a TV as candidate target devices. For example, the speaker and the TV may include an externally viewable indicator (e.g., LED indicator). The electronic device 701 may identify the indicator as the common function of the speaker and the TV. The electronic device 701 may provide the hint by differently controlling (e.g., flickering at different frequency or emitting light of different color) the indicators of the TV and speaker.

After providing the hint, the electronic device 701 may provide a query to the user to prompt the user to select one of candidate target devices. For example, the query may include information about current states of the candidate target devices. For example, after controlling the indicator of the TV to a first color and the indicator of the speaker to a second color that is different from the first color, the electronic device 701 may provide the user with a query associated with a hint, such as "Do you want to turn down the volume of the device of the first color?" For another example, after controlling the indicator of the TV to a first color and the indicator of the speaker to a second color that is different from the first color, the electronic device 701 may provide the user with a query associated with a hint, such as "Device of which color do you want to turn down the volume of?"

For example, a user's utterance may be "Turn up the volume". In this case, the electronic device 701 may identify a plurality of candidate target devices (e.g., first speaker and second speaker playing music) having a volume adjustment function. For example, the electronic device 701 may identify an indicator (e.g., LED indicator) as the common function of the first speaker and the second speaker. In an example, the first speaker and the second speaker may have different indicator support colors. The indicator of the first speaker may include a red LED and a green LED. The indicator of the second speaker may include a blue LED, a yellow LED, a red LED, and a green LED. In this case, after controlling the LEDs of the first speaker to a first color and the LEDs of the second speaker to a second color that is different from the first color, the electronic device 701 may provide the user with a query associated with a hint, such as "Device of which color do you want to turn down the volume of?"

For example, a user's utterance may be "Turn off the TV". In this case, the electronic device 701 may identify a plurality of candidate TVs (e.g., first TV and second TV) that are currently in ON state. For example, the electronic device 701 may identify channel adjustment as the common function of the first TV and the second TV. In this case, after controlling the first TV to a first channel and the second TV to a second channel that is different from the first channel, the electronic device 701 may provide the user with a query associated with a hint, such as "TV of which channel do you want to turn off?" For example, a user's utterance may be "Turn off the music". In this case, the electronic device 701 may identify a plurality of candidate speakers (e.g., first speaker and second speaker) that are currently playing music. The electronic device 701 may identify music output as the common function of the first speaker and the second speaker. In this case, the electronic device 701 may provide the user with a hint by outputting different pieces of music (e.g., beep sound) to the first speaker and the second speaker. For example, after outputting a beep sound to the first speaker, the electronic device 701 may provide the user with a query associated with a hint (beep sound), such as "Do you want to turn off the speaker that has output the beep sound?"

In an embodiment, the electronic device 701 may fail to identify the common function associated with candidate target devices. According to an embodiment, the electronic device 701 may be configured to provide, if the common function is not identified, a hint based on locations of a plurality of candidate target devices (e.g., operation 915 of FIG. 9). According to an embodiment, the electronic device 701 may be configured to generate a hint using different functions if the common function is not identified. For example, a user's utterance may be "Turn up the music volume". Based on the user's utterance, the electronic device 701 may identify the first speaker and second speaker playing music as candidate target devices. The first speaker may include an external LED (e.g., indicator), but the second speaker may include a display. In this case, the electronic device 701 may be configured to provide the hint by turning on the LED of the first speaker and displaying a specified image on the second speaker.

By providing the hint based on the common function, the electronic device 701 may provide the hint not only to candidate target devices of the same type but also to candidate target devices of different types. The electronic device 701 may determine (e.g., operation 1225 of FIG. 12) a target device that is to perform an operation corresponding to a user's utterance by providing a query associated with a hint to the user and receiving a response to the query from the user. For example, the electronic device 701 may identify state information indicating a control state associated with the hint from data corresponding to the response utterance. The electronic device 701 may identify, as a target device, a candidate target device corresponding to the identified state information among a plurality of candidate target devices.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
communication circuitry;
memory that stores instructions; and
at least one processor, comprising processing circuitry, configured, individually or collectively, to execute the instructions and to cause the electronic device to:
obtain utterance data and location information of a user;
identify a type and control function of a target electronic device based on the utterance data;
identify a plurality of candidate electronic devices corresponding to the location information and the type;
identify a common function between the plurality of candidate electronic devices based on identification of the plurality of candidate electronic devices;
differently control the common function of each of the plurality of candidate electronic devices to provide respective output notifications from each of the plurality of candidate electronic devices;
provide, after the notifications are provided, the user with a query including information about a control state of at least one of the plurality of candidate electronic devices controlled to provide the notifications;
obtain, from the user, response utterance data including a response to the query;
identify state information indicating a control state associated with one of the notifications from the response utterance data;
identify, as a target electronic device to perform the control function, a candidate electronic device corresponding to the identified state information from among the plurality of candidate electronic devices based on the response utterance data; and
control the target electronic device to perform the control function, using the communication circuitry.

2. The electronic device of claim 1, wherein at least one processor, comprising processing circuitry, is configured individually or collectively to cause the electronic device to:
identify functions of the plurality of candidate electronic devices; and
identify, as the common function, a function commonly shared between the plurality of candidate electronic devices among the identified functions.

3. The electronic device of claim 1, wherein at least one processor, comprising processing circuitry, is configured individually or collectively to cause the electronic device to:
identify functions of the plurality of candidate electronic devices; and
identify, as the common function, a function belonging to a common category between the plurality of candidate electronic devices among the identified functions.

4. The electronic device of claim 1, wherein at least one processor, comprising processing circuitry, is configured individually or collectively to cause the electronic device to differently control a level of the common function for each of the plurality of candidate electronic devices to provide the respective notifications, wherein the level is set based on color, brightness, volume, or channel.

5. The electronic device of claim 1, wherein at least one processor, comprising processing circuitry, is configured individually or collectively to cause the electronic device to receive the utterance data from a microphone using the communication circuitry, wherein the location information corresponds to location information of the microphone.

6. A method for an electronic device, the method comprising:
obtaining utterance data and location information of a user;
identifying a type and control function of a target electronic device based on the utterance data;
identifying a plurality of candidate electronic devices corresponding to the location information and the type;
identifying a common function between the plurality of candidate electronic devices based on identification of the plurality of candidate electronic devices;
differently controlling the common function of each of the plurality of candidate electronic devices to provide respective output notification from each of the plurality of candidate electronic devices;
providing, after the notifications are provided, the user with a query including information about a control state of at least one of the plurality of candidate electronic devices controlled to provide the notifications;
obtaining, from the user, response utterance data including a response to the query;
identifying state information indicating a control state associated with one of the notifications from the response utterance data;
identifying, as a target electronic device to perform the control function, a candidate electronic device corresponding to the identified state information from among the plurality of candidate electronic devices based on the response utterance data; and
controlling the target electronic device to perform the control function.

7. The method of claim 6, further comprising:
identifying functions of the plurality of candidate electronic devices; and
identifying, as the common function, a function commonly shared between the plurality of candidate electronic devices among the identified functions.

8. The method of claim 6, further comprising:
identifying functions of the plurality of candidate electronic devices; and
identifying, as the common function, a function belonging to a common category between the plurality of candidate electronic devices among the identified functions.

9. The method of claim 6, further comprising differently controlling a level of the common function for each of the plurality of candidate electronic devices to provide the respective notifications, wherein the level is set based on color, brightness, volume, or channel.

10. An electronic device comprising:
communication circuitry;
audio circuitry;
memory that stores instructions; and
at least one processor, comprising processing circuitry, and configured, individually or collectively, to execute the instructions and to cause the electronic device to:
obtain utterance data of a user using the audio circuit;
identify a type and control function of a target electronic device based on the utterance data;
transmit information including the type and the control function to an external server using the communication circuitry;
identify a plurality of candidate electronic devices corresponding to the type and the control function by receiving, from the external server, information of the plurality of candidate electronic devices corresponding to the type and the control function using the communication circuitry;
identify a common function between the plurality of candidate electronic devices based on identification of the plurality of candidate electronic devices;
differently control the common function of each of the plurality of candidate electronic devices to provide respective output notifications from each of the plurality of candidate electronic devices;
provide, after the notifications are provided, the user with a query including information about a control state of at least one of the plurality of candidate electronic devices controlled to provide the notifications;
obtain, from the user, response utterance data including a response to the query using the audio circuitry;
identify state information indicating a control state associated with one of the notifications from the response utterance data;
identify, as a target electronic device that is to perform the control function, a candidate electronic device corresponding to the identified state information from among the plurality of candidate electronic devices based on the response utterance data; and
control the target electronic device to perform the control function using the communication circuitry.

* * * * *